(12) United States Patent
Park et al.

(10) Patent No.: US 10,784,934 B2
(45) Date of Patent: Sep. 22, 2020

(54) LOW PEAK-TO-AVERAGE POWER RATIO PRECODED REFERENCE SIGNAL DESIGN FOR MULTIPLE-INPUT, MULTIPLE-OUTPUT TRANSMISSIONS

(71) Applicant: Qualcomm Incorporated, San Diego, CA (US)

(72) Inventors: Se Yong Park, San Diego, CA (US); Wei Zeng, San Diego, CA (US); Alexandros Manolakos, San Diego, CA (US); Sony Akkarakaran, Poway, CA (US); Yi Huang, San Diego, CA (US); Renqiu Wang, San Diego, CA (US); Hao Xu, Beijing (CN); Yu Zhang, Beijing (CN); Joseph Binamira Soriaga, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/476,408

(22) PCT Filed: Feb. 5, 2018

(86) PCT No.: PCT/CN2018/075242
§ 371 (c)(1),
(2) Date: Jul. 8, 2019

(87) PCT Pub. No.: WO2018/141282
PCT Pub. Date: Aug. 9, 2018

(65) Prior Publication Data
US 2019/0379437 A1    Dec. 12, 2019

(30) Foreign Application Priority Data

Feb. 6, 2017   (WO) ................ PCT/CN2017/072948

(51) Int. Cl.
*H04B 7/0456*    (2017.01)
*H04L 5/00*      (2006.01)
*H04L 27/26*     (2006.01)

(52) U.S. Cl.
CPC ......... *H04B 7/0465* (2013.01); *H04L 5/0005* (2013.01); *H04L 27/2613* (2013.01); *H04L 27/2636* (2013.01)

(58) Field of Classification Search
CPC . H04B 7/0465; H04L 5/0005; H04L 27/2613; H04L 27/2636
(Continued)

(56) References Cited

U.S. PATENT DOCUMENTS

| 2010/0232311 | A1 | 9/2010 | Zhang et al. | |
| 2011/0128909 | A1* | 6/2011 | Luo | H04L 5/0023 370/328 |
| 2016/0192338 | A1* | 6/2016 | Benjebbour | H04B 7/0617 370/330 |

FOREIGN PATENT DOCUMENTS

| CN | 102104568 A | 6/2011 |
| CN | 103609085 A | 2/2014 |

(Continued)

OTHER PUBLICATIONS

International Search Report and Written Opinion—PCT/CN2017/072948—ISA/EPO—dated Oct. 27, 2017.
(Continued)

*Primary Examiner* — Fitwi Y Hailegiorgis
(74) *Attorney, Agent, or Firm* — Holland & Hart LLP

(57) ABSTRACT

Methods, systems, and devices for wireless communication are described that support a low peak-to-average power ratio (PAPR) precoded reference signal design for multiple-input, multiple-output (MIMO) transmissions. A user equipment (UE) may identify multiple sets of symbols associated with different reference signal waveforms, where each reference
(Continued)

signal waveform may be associated with a low PAPR. In some cases, different single-carrier reference signal waveforms may be mapped to subsets of frequency resources through frequency division multiplexing (FDM) for a transmission on a single antenna. However, the addition of single-carrier waveforms through FDM for a transmission via an antenna may result in an uplink transmission having a high PAPR (e.g., as compared to single-carrier waveforms). The UE may reduce the PAPR of the uplink transmission by multiplexing the reference signal waveforms in the time domain (e.g., using time division multiplexing (TDM)).

84 Claims, 21 Drawing Sheets

(58) Field of Classification Search
USPC .......................... 375/261, 262; 370/328, 330
See application file for complete search history.

(56) References Cited

FOREIGN PATENT DOCUMENTS

| WO | WO-2007041086 A1 | 4/2007 |
|----|------------------|--------|
| WO | WO 2010 131229 A1 | 11/2010 |
| WO | WO 2013 023674 A1 | 2/2013 |

OTHER PUBLICATIONS

International Search Report and Written Opinion—PCT/CN2018/075242—ISA/EPO—dated Apr. 20, 2018.

* cited by examiner

LOW PEAK-TO-AVERAGE POWER RATIO PRECODED REFERENCE SIGNAL DESIGN FOR MULTIPLE-INPUT, MULTIPLE-OUTPUT TRANSMISSIONS

CROSS REFERENCES

The present application is a 371 national phase filing of International Application No. PCT/CN2018/075242 to Park et.al., entitled "LOW PEAK-TO-AVERAGE POWER RATIO PRECODED REFERENCE SIGNAL DESIGN FOR MULTIPLE-INPUT, MULTIPLE-OUTPUT TRANSMISSIONS", filed Feb. 5, 2018, which claims priority to Chinese PCT Application No. PCT/CN2017/072948 to Park et al., entitled "LOW PEAK-TO-AVERAGE POWER RATIO PRECODED REFERENCE SIGNAL DESIGN FOR MULTIPLE-INPUT, MULTIPLE-OUTPUT TRANSMISSIONS", filed Feb. 6, 2017, each of which is assigned to the assignee hereof.

BACKGROUND

The present disclosure relates to wireless communication systems and more particularly to a low peak-to-average power ratio (PAPR) precoded reference signal design for multiple-input, multiple-output transmissions.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (TDMA) systems, and orthogonal frequency-division multiple access (OFDMA) systems (e.g., a Long Term Evolution (LTE) system, or a New Radio (NR) system).

A wireless multiple-access communications system may include a number of base stations or access network nodes, each simultaneously supporting communication for multiple communication devices, otherwise known as user equipments (UEs). In some cases, a UE may communicate with a base station via multiple antennas using MIMO techniques. For support of MIMO techniques, the UE may transmit multiple reference signals to the base station via multiple antenna ports. For each physical antenna, the UE may multiplex and precode multiple reference signals from different antenna ports. However, multiplexing multiple reference signals for an uplink transmission on an antenna may increase the PAPR of the uplink transmission, which may be detrimental to communication in the wireless communications system.

SUMMARY

The described techniques relate to improved methods, systems, devices, or apparatuses that support a low PAPR precoded reference signal design for MIMO transmissions. A UE may identify multiple sets of symbols associated with different reference signal streams, where each reference signal stream may be associated (e.g., if transmitted independently) with a low PAPR. In some cases, different single-carrier reference signal streams may be mapped to subsets of frequency resources through frequency division multiplexing (FDM) for a transmission on a single antenna. However, the multiplexing of single-carrier streams using FDM for a transmission via an antenna may result in an uplink transmission having a higher PAPR (e.g., as compared to the individual single-carrier streams). In some examples, the UE may reduce the PAPR of the uplink transmission by multiplexing the reference signal streams in the time domain (e.g., using time division multiplexing (TDM)). These techniques may help to ensure that uplink transmissions from a UE on individual antennas maintain a low PAPR.

A method of wireless communication is described. The method may include identifying a plurality of time domain reference signal symbol sets for transmission via a plurality of antennas in a symbol period, wherein each of the plurality of time domain reference signal symbol sets is associated with an antenna port, performing respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms, mapping the plurality of frequency domain signals to respective subsets of a set of subcarriers, performing respective frequency to time domain transforms on the plurality of mapped frequency domain signals to obtain a plurality of time domain waveforms, and transmitting the plurality of time domain waveforms to a receiver via the plurality of antennas in the symbol period.

An apparatus for wireless communication is described. The apparatus may include means for identifying a plurality of time domain reference signal symbol sets for transmission via a plurality of antennas in a symbol period, wherein each of the plurality of time domain reference signal symbol sets is associated with an antenna port, means for performing respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms, means for mapping the plurality of frequency domain signals to respective subsets of a set of subcarriers, means for performing respective frequency to time domain transforms on the plurality of mapped frequency domain signals to obtain a plurality of time domain waveforms, and means for transmitting the plurality of time domain waveforms to a receiver via the plurality of antennas in the symbol period.

Another apparatus for wireless communication is described. The apparatus may include a processor, memory in electronic communication with the processor, and instructions stored in the memory. The instructions may be operable to cause the processor to identify a plurality of time domain reference signal symbol sets for transmission via a plurality of antennas in a symbol period, wherein each of the plurality of time domain reference signal symbol sets is associated with an antenna port, perform respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms, map the plurality of frequency domain signals to respective subsets of a set of subcarriers, perform respective frequency to time domain transforms on the plurality of mapped frequency domain signals to obtain a plurality of time domain waveforms, and transmit the plurality of time domain waveforms to a receiver via the plurality of antennas in the symbol period.

A non-transitory computer readable medium for wireless communication is described. The non-transitory computer-readable medium may include instructions operable to cause a processor to identify a plurality of time domain reference signal symbol sets for transmission via a plurality of antennas in a symbol period, wherein each of the plurality of time domain reference signal symbol sets is associated with an antenna port, perform respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms, map the plurality of frequency domain signals to respective subsets of a set of subcarriers, perform respective frequency to time domain transforms on the plurality of mapped frequency domain signals to obtain a plurality of time domain waveforms, and transmit the plurality of time domain waveforms to a receiver via the plurality of antennas in the symbol period.

Some examples of the method, apparatus, and non-transitory computer-readable medium described above may further include processes, features, means, or instructions for preceding, for each of the plurality of antennas, the plurality of time domain waveforms using a preceding vector.

In some examples of the method, apparatus, and non-transitory computer-readable medium described above, each precoding phasor of the precoding vector may be within a predetermined range of other precoding phasors of the precoding vector.

Some examples of the method, apparatus, and non-transitory computer-readable medium described above may further include processes, features, means, or instructions for preceding, for each of the plurality of antennas, the plurality of frequency domain signals using a preceding vector.

In some examples of the method, apparatus, and non-transitory computer-readable medium described above, each precoding phasor of the precoding vector may be within a predetermined range of other precoding phasors of the precoding vector.

Some examples of the method, apparatus, and non-transitory computer-readable medium described above may further include processes, features, means, or instructions for preceding, for each of the plurality of antennas, at least two of the plurality of frequency domain signals using a same preceding phasor, wherein the precoded at least two of the plurality of frequency domain signals may be mapped to non-contiguous subsets of the set of subcarriers.

In some examples of the method, apparatus, and non-transitory computer-readable medium described above, the plurality of time domain reference signal symbol sets may be orthogonal to each other within at least one of the plurality of time domain waveforms.

Some examples of the method, apparatus, and non-transitory computer-readable medium described above may further include processes, features, means, or instructions for identifying a desired frequency domain pilot sequence for at least one of the plurality of time domain reference signal symbol sets. Some examples of the method, apparatus, and non-transitory computer-readable medium described above may further include processes, features, means, or instructions for deriving the at least one of the plurality of time domain reference signal symbol sets based at least in part on the desired frequency domain pilot sequence.

In some examples of the method, apparatus, and non-transitory computer-readable medium described above, the deriving the at least one of the plurality of time domain reference signal symbol sets comprises: performing a frequency to time domain transform based at least in part on the identified desired frequency domain pilot sequence.

Some examples of the method, apparatus, and non-transitory computer-readable medium described above may further include processes, features, means, or instructions for determining the respective subsets of time domain inputs based at least in part on transform sizes of the respective time to frequency domain transform sizes.

Some examples of the method, apparatus, and non-transitory computer-readable medium described above may further include processes, features, means, or instructions for determining the respective subsets of time domain inputs based at least in part on frequency domain upsampling factors of the respective subsets of the set of subcarriers.

Some examples of the method, apparatus, and non-transitory computer-readable medium described above may further include processes, features, means, or instructions for determining the respective subsets of time domain inputs based at least in part on a transform size of the frequency to time domain transform.

In some examples of the method, apparatus, and non-transitory computer-readable medium described above, at least two of the respective subsets of the set of subcarriers comprise interleaved subcarriers with respect to each other.

In some examples of the method, apparatus, and non-transitory computer-readable medium described above, a frequency domain upsampling factor of the at least two of the respective subsets of the set of subcarriers may be based at least in part on an interleaving pattern of the caved subcarriers.

In some examples of the method, apparatus, and non-transitory computer-readable medium described above, at least two of the respective subsets of the set of subcarriers may be non-contiguous with respect to each other.

In some examples of the method, apparatus, and non-transitory computer-readable medium described above, at least two of the respective subsets of the set of subcarriers at least partially overlap with each other.

In some examples of the method, apparatus, and non-transitory computer-readable medium described above, the respective time to frequency domain transform sizes of at least two of the respective time to frequency domain transforms may be a same transform size.

In some examples of the method, apparatus, and non-transitory computer-readable medium described above, the subset of time domain inputs of a first of the at least two of the respective time to frequency domain transforms may be disjoint with the subset of time domain inputs of a second of the at least two of the respective time to frequency domain transforms.

In some examples of the method, apparatus, and non-transitory computer-readable medium described above, the respective time to frequency domain transform sizes of at least two of the respective time to frequency domain transforms may be different with respect to each other.

In some examples of the method, apparatus, and non-transitory computer-readable medium described above, each time domain reference signal symbol set may be mapped to the respective subset of time domain inputs of the respective time to frequency domain transforms based at least in part on inserting one or more null data points into at least one of the time domain reference signal symbol sets.

Some examples of the method, apparatus, and non-transitory computer-readable medium described above may further include processes, features, means, or instructions for mapping, at the first wireless device, the first frequency domain signal to a first subset of subcarriers. In some examples of the method, apparatus, and non-transitory computer-readable medium described above, the first subset of subcarriers being orthogonal in the frequency domain to a corresponding subset of subcarriers to which the second frequency domain signal may be mapped at the second wireless device.

DETAILED DESCRIPTION

A wireless communications system may support communication between a base station and a UE. Specifically, the wireless communications system may support downlink transmissions from the base station to the UE and uplink transmissions from the UE to the base station. Uplink transmissions may include data, control signals, and reference signals (e.g., sounding reference signals, etc.). In some cases, a UE may transmit reference signals via multiple antennas using MIMO techniques, Different reference signal waveforms may be multiplexed over a set of frequency resources (i.e., using FDM) for a given uplink transmission on an antenna. For example, a UE may identify respective single-carrier reference signal streams to be transmitted to a base station, and these streams may be multiplexed using FDM for the transmission. In such cases, the PAPR of the uplink transmission including the multiplexed reference signal streams may be high, which may result in reduced throughput in a wireless communication system.

As described herein, some wireless communication systems may support efficient techniques for reducing the PAPR of an uplink transmission that includes multiple reference signal streams transmitted via an antenna. Specifically, a UE may support techniques for multiplexing the different reference signal streams in the time domain (e.g., using TDM) prior to mapping the reference signal streams to different subcarriers of a discrete Fourier transform (DFT)-spread-orthogonal frequency division multiplexing (DFT-s-OFDM) waveform. A UE may identify multiple sets of symbols associated with different pilot sequences to be transmitted to a receiving device (e.g., a base station) during a symbol period. In such cases, the UE may map the symbols to respective subsets of time slots (e.g., orthogonal subsets of time slots), and transform the mapped symbols using a DFT (e.g., DFT spreading) resulting in respective frequency domain signals. The frequency domain signals may then be mapped to multiple subcarriers, and the UE may transform the mapped signals using an IDFT to obtain a time domain waveform that may be transmitted to the receiving device (e.g., a base station). As a result of the signal processing, the resulting time domain waveform may include multiple reference signal streams mapped to orthogonal or pseudo-orthogonal time intervals, and the PAPR of the uplink transmission may be reduced (e.g., substantially equal to the PAPR of a single-carrier waveform).

Aspects of the disclosure introduced above are further described below with reference to a wireless communications system. These and other features are further illustrated by and described with reference to apparatus diagrams and system diagrams that relate to a low PAPR precoded reference signal design for MIMO transmissions.

Figure 1:
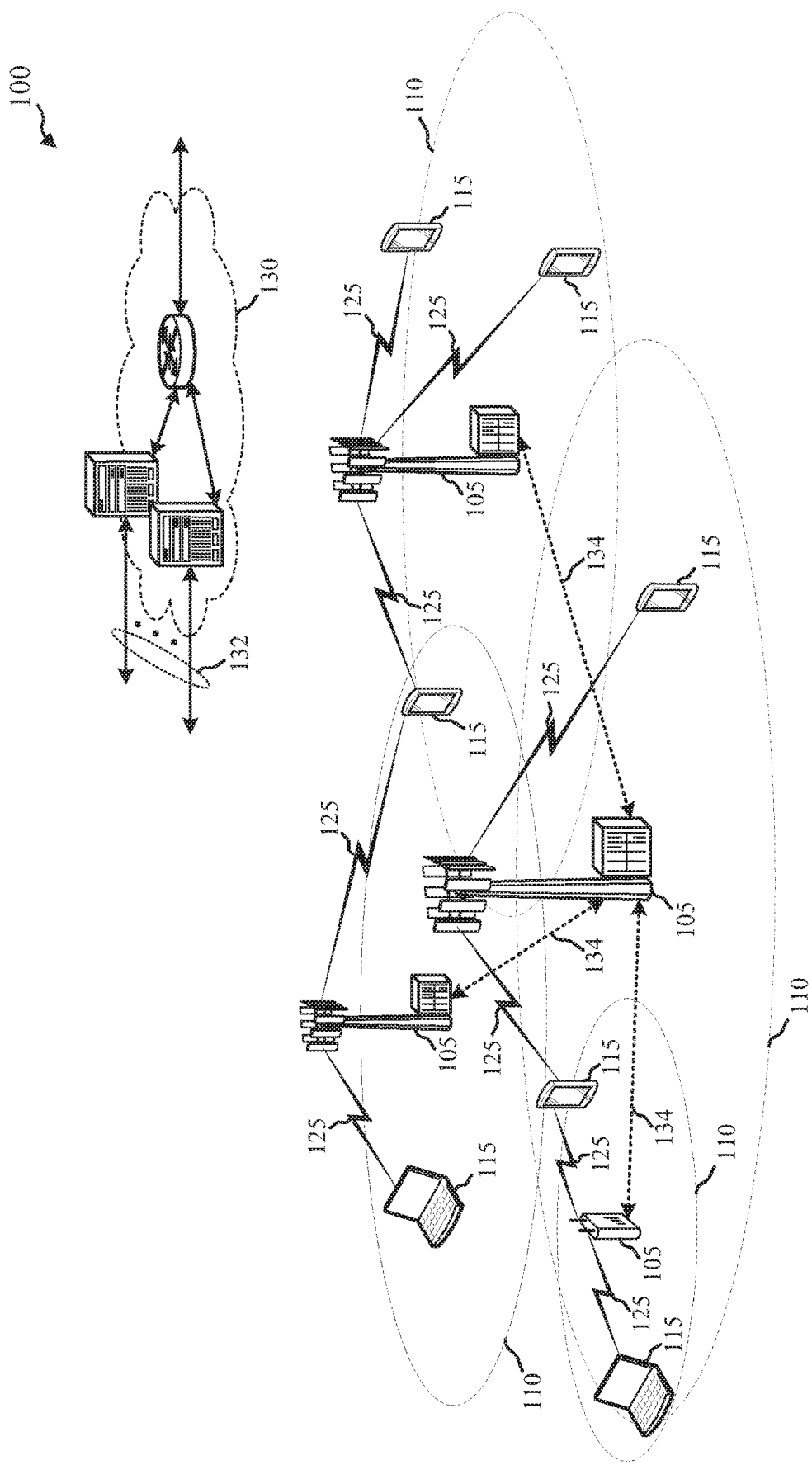
FIG. 1 illustrates an example of a wireless communication system that supports a low PAPR precoded reference signal design for MIMO transmissions in accordance with various aspects of the present disclosure.

FIG. 1 illustrates an example of a wireless communication system 100 that supports a low PAPR precoded reference signal design for MIMO transmissions in accordance with various aspects of the present disclosure. The wireless communication systems 100 includes base stations 105, UEs 115, and a core network 130. In some examples, the wireless communications system 100 may be a LTE (or LTE Advanced) network, or a new radio (NR) network. In some cases, wireless communications system 100 may support enhanced broadband communications, ultra-reliable (e.g., mission critical) communications, low latency communications, and communications for low-cost and low-complexity devices. Wireless communications system 100 may enable a time domain and frequency domain mapping of multiple sets of symbols associated with different streams to achieve a transmitted waveform with low PAPR.

Base stations 105 may wirelessly communicate with UEs 115 via one or more base station antennas. Each base station 105 may provide communication coverage for a respective geographic coverage area 110. Communication links 125 shown in the wireless communications system 100 may include uplink transmissions from a UE 115 to a base station 105, or downlink transmissions, from a base station 105 to a UE 115. Control information may be multiplexed on an uplink channel (e.g., physical uplink control channel (PUCCH) or downlink channel (e.g., physical downlink control channel (PDCCH)) according to various techniques. Similarly, data may be multiplexed on an uplink channel (e.g., physical uplink shared channel (PUSCH)) or downlink channel (e.g., physical downlink shared channel (PDSCH)) according to various techniques. Control information and data may be multiplexed on a downlink channel, for example, using TDM techniques, FDM techniques, or hybrid TDM-FDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter transmission time intervals (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC, across multiple spectrums. In some examples, NR shared spectrum may increase spectrum utilization and spectral efficiency, specifically through dynamic vertical (e.g., across frequency) and horizontal (e.g., across time) sharing of resources. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communication system 100 may also utilize extremely high frequency (EHF) portions of the spectrum (e.g., from 30 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support millimeter wave (mmW) communications between UEs 115 and base stations 105. Devices operating in mmW, SHF, or EHF bands may have multiple antennas to allow beamforming. Beamforming may also be employed outside of these frequency bands (e.g., in any scenario in which increased cellular coverage is desired). That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may use a receive beam (e.g., an antenna subarray or antenna weights), or may try multiple receive beams while receiving the signals.

MIMO wireless systems use a transmission scheme between a transmitter e.g., a base station 105) and a receiver (e.g., a UE 115), where both transmitter and receiver are equipped with multiple antennas. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Elements of wireless communications system 100 (e.g., UE 115 and base station 105) may utilize digital signal processors (DSPs) implementing Fourier transforms. A DFT may transform discrete time-domain data sets into a discrete frequency-domain representation. The discrete frequency-domain representation may be used to map signals to subcarriers in the frequency domain. Further, an inverse DFT (IDFT) may be used to transform the discrete frequency representation (e.g., information represented in subcarriers) into a discrete time representation (e.g., a signal carrying information in the time domain). For example, a transmitter may perform a DFT to transform a time domain signal to the frequency domain, map the frequency domain signal to subcarriers, and subsequently perform an IDFT to transform the frequency domain signal mapped to subcarriers into a time domain signal having the information mapped to the subcarriers. Such techniques may effectively spread the time domain signal within the desired frequencies of the subcarriers and thus reduce symbol overlap in time that causes a high PAPR for the time domain signal.

A UE 115 may transmit sounding reference signals (SRSs) to a base station 105 to allow the base station to estimate uplink channel quality over a wide bandwidth. SRS may be transmitted by UE 115 using a predetermined sequence (e.g., a Zadoff-Chu sequence) known by the base station. An SRS transmission may not be associated with transmission of data on another channel, and may be transmitted periodically on a wide bandwidth (e.g., a bandwidth including more subcarriers than are allocated for uplink data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an uplink scheduler. A base station 105 may also utilize an SRS to check timing alignment status and send time alignment commands to the UE 115.

In some cases, a UE 115 may transmit reference signals (e.g., SRSs) to a base station 105 in an uplink transmission via multiple antennas using MIMO techniques. Specifically, a UE 115 may identify multiple sets of symbols of different pilot sequences to transmit to a base station 105 in a symbol period. Prior to transmitting the signals, the UE 115 may precode the symbols of the pilot sequences and multiplex the symbols on a set of time and frequency resources. For instance, different reference signal waveforms (e.g., different DFT-s-OFDM waveforms) associated with different pilot sequences may be multiplexed over a set of frequency resources (i.e., using FDM) for an uplink transmission, where the different waveforms would, if sent independently, have a low PAPR property. However, multiplexing these waveforms using FDM for an uplink transmission may result in the uplink transmission having a high PAPR (e.g., as compared to single-carrier waveforms).

Wireless communications system 100 may support efficient techniques for reducing the PAPR of an uplink transmission that includes multiple reference signal streams transmitted on a single antenna. Specifically, a UE 115 may support techniques for multiplexing the different reference signal streams in the time domain using TDM) prior to mapping the streams to subcarriers of the DFT-s-OFDM waveform. A UE 115 may identify multiple sets of symbols associated with different pilot sequences to be transmitted to a base station 105 during a symbol period. In such cases, the UE 115 may map the symbols to respective subsets of time slots (e.g., orthogonal subsets of time slots), and transform the mapped symbols using a DFT (e.g., DFT spreading) resulting in respective frequency domain signals. The frequency domain signals may then be mapped to multiple subcarriers, and the UE 115 may transform the mapped signals using an IDFT to obtain a time domain waveform that may be transmitted to a base station 105. As a result of the signal processing, the resulting time domain waveform may have the multiple reference signal streams mapped to orthogonal time intervals, and the PAPR of the uplink transmission may be low (e.g., having the same or substantially the same PAPR property as a single reference signal stream).

Figure 2:
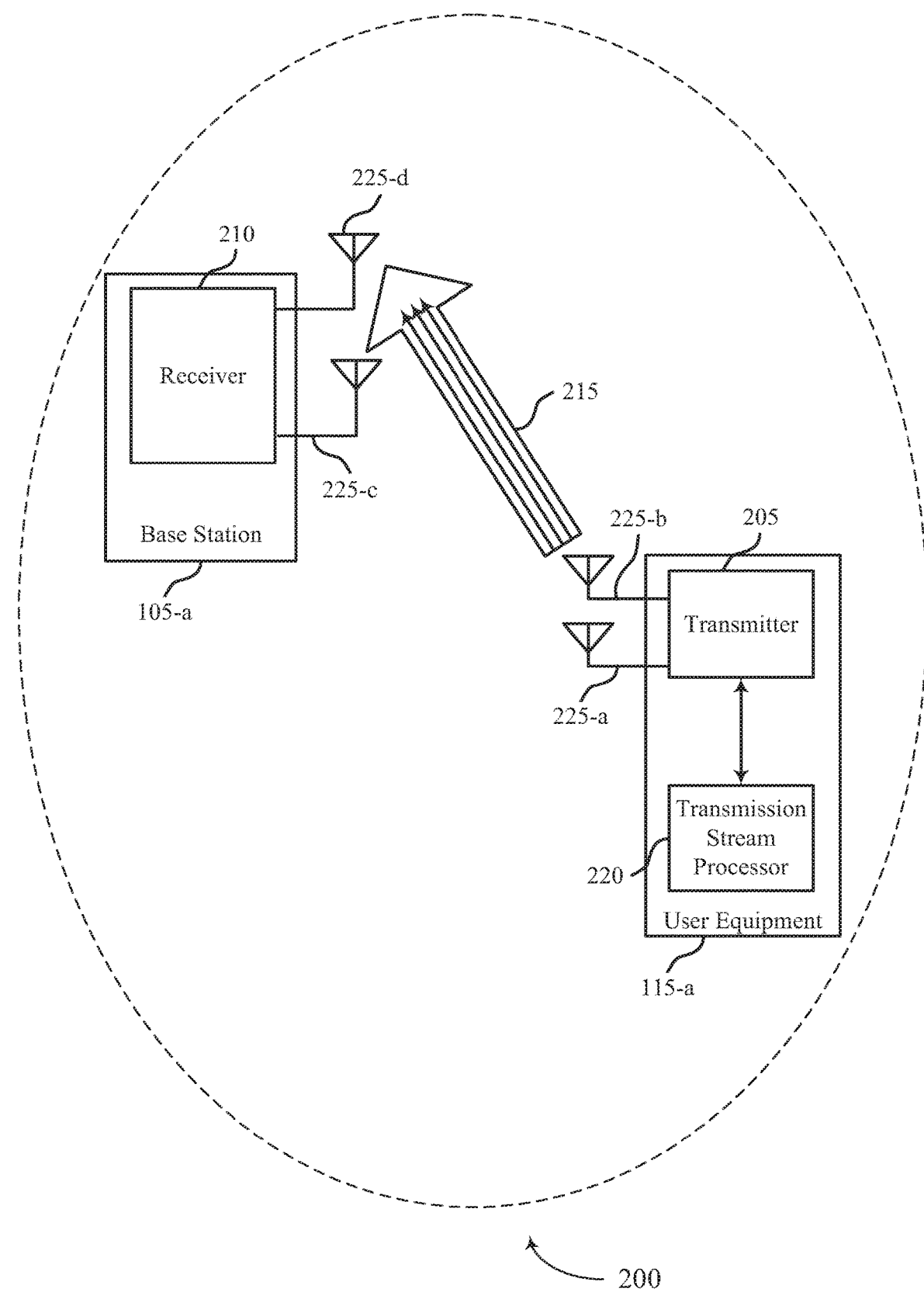
FIG. 2 illustrates an example of a wireless communication system that supports a low PAPR precoded reference signal design for MIMO transmissions in accordance with various aspects of the present disclosure.

FIG. 2 illustrates an example of a wireless communications system 200 that supports a low PAPR precoded reference signal design for MIMO transmissions in accordance with various aspects of the present disclosure. Wireless communications system 200 includes base station 105-a, which may be an example of a base station 105 described with reference to FIG. 1. Wireless communication system also includes UE 115-a, which may be an example of a UE 115 described with reference to FIG. 1. UE 115-a may be configured with a transmitter 205 used to transmit signals to base station 105-a, and base station 105-a may be configured with a receiver 210 used to receive signals from UE 115-a. The transmitter 205 may communicate with a transmission stream processor 220 to process uplink signals prior to transmission.

UE 115-a may communicate with base station 105-a via multiple antennas 225 using MIMO techniques. In such cases, a UE 115-a may transmit multiple parallel data streams to base station 105-a (e.g., to increase the data rate within wireless communications system 200). In some cases, the quality of a channel used to transmit each parallel data stream 215 may depend on, e.g., the multipath environment, precoding, interference, etc. Precoding may refer to the application of weighting (e.g., phase shifting, amplitude scaling, etc.) to a set of signals such that the superposition of these signals at a receiving device improves the received signal quality (e.g., improves the signal-to-interference and noise ratio (SINR) of a transmission). In order to support efficient scheduling of resources, a base station 105-a may allocate resources based on an estimate of the quality of different channels used to transmit data.

To facilitate channel estimation, UE 115-a may transmit reference signals (e.g., SRSs, etc.) over a wide bandwidth. SRS transmissions may allow the base station 105-a to estimate the quality of a channel used to transmit data via antennas 225. The base station may then use the measured information from SRS transmissions for frequency or spatial layer-dependent scheduling. The timing of the SRS transmissions may be controlled by the base station 105-a. Additionally, base station 105-a may control the transmission bandwidth using cell-specific parameters and mobile-specific parameters (e.g., the SRS bandwidth configuration). In wireless communications system 200, a UE 115 may be configured (e.g., via higher layer signaling) to transmit the SRS on a suitable number of antenna ports of a serving cell (e.g., ports 0, 1, 2, and 4). That is, reference signals may be spatially multiplexed on channels used to transmit data via antennas 225 to allow a base station to obtain an accurate estimate of the quality of channels used for MIMO data transmissions.

As an example, UE 115-a may identify two reference signal sequences, where each sequence would have a low PAPR if transmitted independently via an antenna, to transmit to base station 105-a via a single antenna (e.g., antenna 225-a). However, in some cases, the reference signal sequences may be multiplexed using FDM and combined such that an uplink transmission from a single antenna is not a single carrier waveform. Thus, the low PAPR properties of the individual single carrier pilot sequences may be compromised, and the PAPR of an uplink transmission may be high. Wireless communications system 200 may support techniques for reducing the PAPR of an uplink transmission of multiple reference signal streams via a single antenna.

Figure 3:
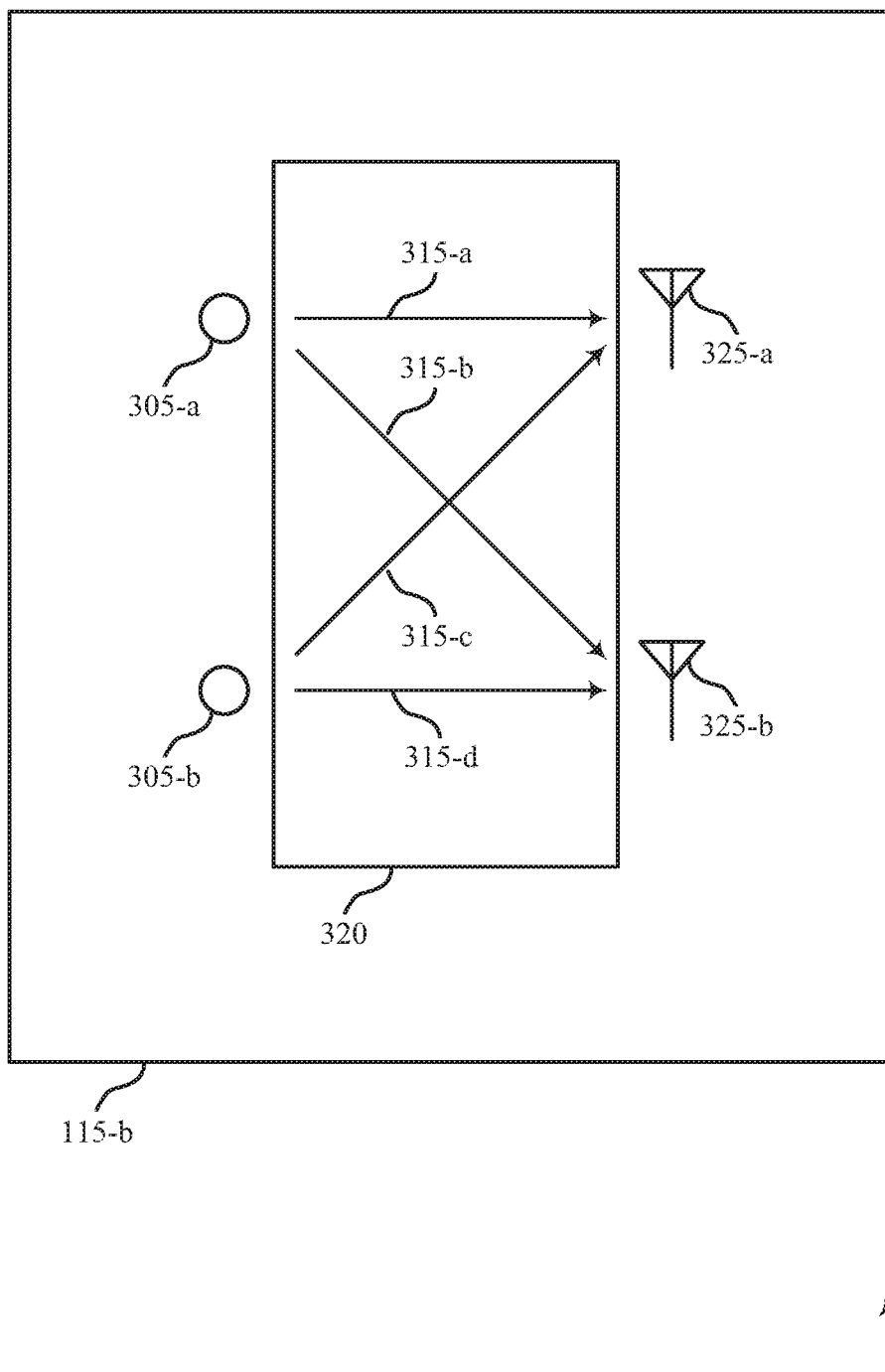
FIG. 3 illustrates a block diagram of a wireless device that supports a low PAPR precoded reference signal design for MIMO transmissions in accordance with various aspects of the present disclosure.

FIG. 3 illustrates a block diagram 300 of a wireless device 115-b that supports low PAPR precoded reference signal design for MIMO transmission in accordance with various aspects of the present disclosure. Wireless device 115-b may be an example of a UE 115 described with reference to FIGS. 1 and 2. As illustrated, wireless device 115-b contains two logical antenna ports 305 which are connected to physical antennas 325-a and 325-b. Physical antennas 325-a and 325-b may be examples of the transmitting antennas 225-a and 225-b described with reference to FIG. 2. In the present example, a precoding matrix is applied to signals at logical antenna ports 305 using precoder 320 (e.g., by matrix multiplication) and these signals are mapped to the physical antennas 325. Precoder 320 may be a component of transmission stream processor 220 described with reference to FIG. 2.

The present example illustrates a single precoding matrix 320; however multiple precoding matrices may be used (e.g., a different precoding matrix may be applied to different frequency bands, tones, physical resource blocks (PRBs), physical resource groups (PRGs), etc.). Although displayed as having two logical antenna ports 305 and two physical antennas 325, any suitable number of ports or antennas may be used within the scope of the present disclosure. In some cases, the number of logical antenna ports 305 may be less than or equal to the number of physical antennas 325. Accordingly, the number of logical antenna ports 305 and physical antennas 325 need not be equal.

In the present example, each logical antenna port 305 may have one or more respective reference signals (or pilot sequences) associated with it. In some cases, the precoding matrix 320 may be an n-by-m matrix, connecting 'm' logical antenna ports to 'n' physical antennas (e.g., by matrix multiplication). Accordingly, precoding matrix 320 may apply appropriate phase shifts and/or amplitude modulation to the respective reference signals (or pilot sequences) of antenna ports 305. As an example, a reference signal of antenna port 305-a may be modified (e.g., phase shifted or otherwise altered) according to precoding phasor 315-a before being mapped to physical antenna 325-a. In some examples, precoding phasor 315-a may be a complex number such that the matrix multiplication achieves frequency and amplitude modulation. Similarly, a reference signal at antenna port 305-b may be modified according to precoding phasor 315-c before being combined with the precoded reference signal from antenna port 305-a for transmission via physical antenna 325-a. Reference signals from antenna ports 305-a and 305-b may be precoded using similar techniques before being mapped to physical antenna 325-b (e.g., by matrix components 315-b and 315-d, respectively).

In aspects of the present disclosure, physical antennas 325-a and/or 325-b may be operable to transmit a combination (e.g., a linear combination) of the modified reference signals at antenna ports 305-a and 305-b (e.g., modified according to the respective matrix components 315). Accordingly, while the original reference signals 305-a and 305-b may individually contain desirable (e.g., low) PAPR properties, a linear combination of these signals following precoding may generate a multiplexed signal with a higher than desired PAPR. Techniques described herein may enable a UE to reduce the PAPR of an uplink transmission including reference signals multiplexed for a transmission on a physical antenna 325.

Figure 4A:
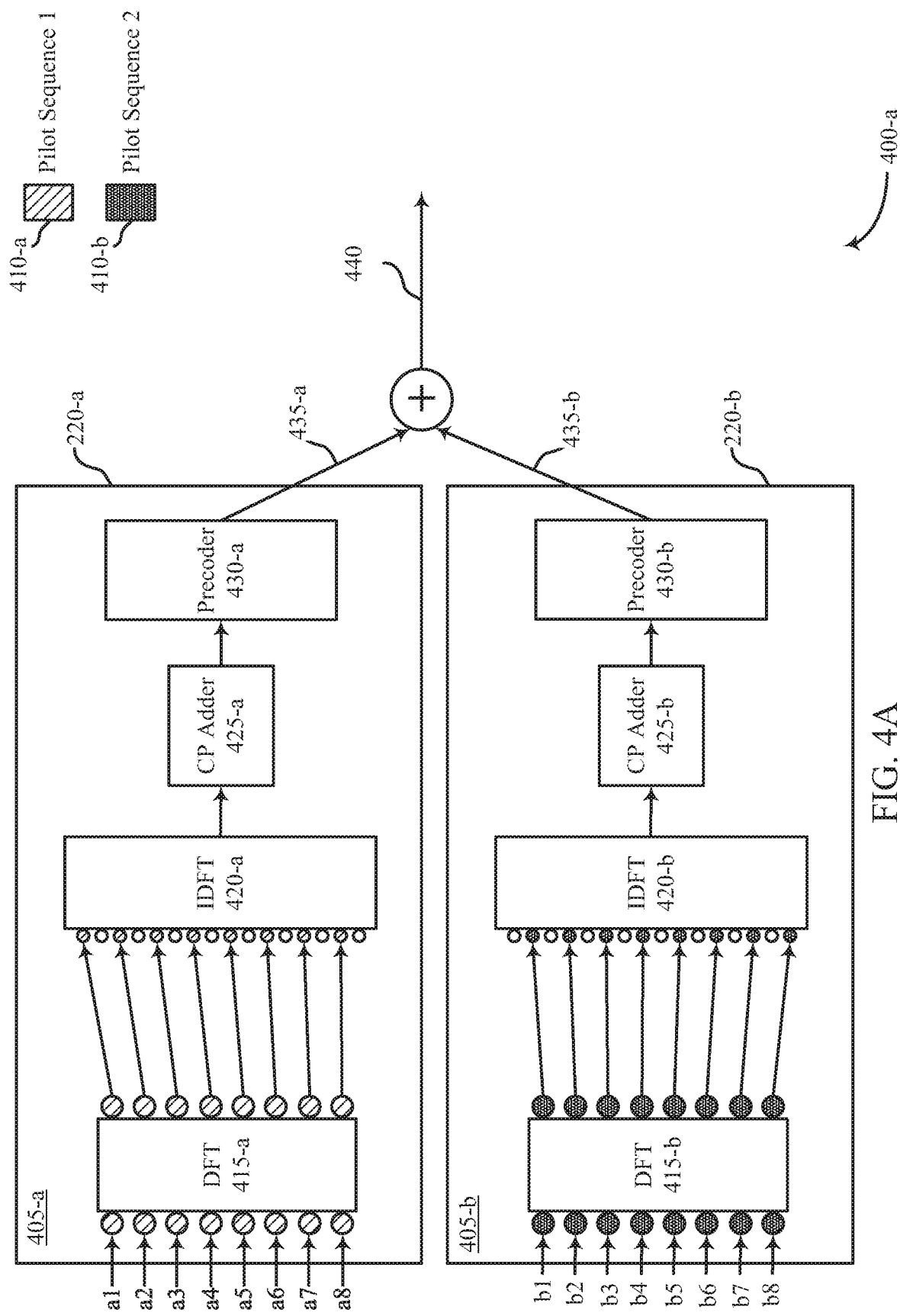
FIGS. 4A and 4B illustrate an example of a signal processing scheme in a system that supports a low PAPR precoded reference signal design for MIMO transmissions in accordance with various aspects of the present disclosure.

FIG. 4A illustrates an example of a signal processing scheme 400-a in a system. Techniques described with reference to FIG. 4A may be performed at a UE 115 described with reference to FIGS. 1 through 3. In some cases, opposite but complementary techniques to those described with reference to FIG. 4A may be performed by a base station 105 described with reference to FIGS. 1 and 2.

Signal processing scheme 400-a illustrates two logical antenna ports 405-a and 405-b, each with a respective pilot sequence 410-a and 410-b. In the present example, the outputs of the signal processing scheme 400-a at each of logical antenna ports 405-a and 405-b are fed to a single physical antenna (not shown, but which may be an example of the corresponding components described with reference to FIGS. 2 and 3). It is to be understood that more than two logical antenna ports 405 may be used in accordance with the present example, and that each antenna port 405 may be connected to one or more physical antennas. Signal processing scheme 400-a may include processes performed by a transmission stream processor 220-a at antenna port 405-a and processes performed by a transmission stream processor 220-b at antenna port 405-b. Transmission stream processors 220-a and 220-b may each include one or more DFT components 415, one or more DFT components 420, one or more cyclic prefix (CP) adders 425, and one or more precoders 430. These components may be used to process reference signals (e.g., the respective pilot sequences 410) prior to an uplink transmission 440.

In the present example, pilot sequence 410-a may include a set of symbols (e.g., eight symbols identified as a1 through a8) and may serve as an input to transmission stream processor 220-a at logical antenna port 405-a. Similarly, pilot sequence 410-b may include a set of symbols (e.g., eight symbols identified as b1 through b8) and may serve as an input to transmission stream processor 220-b at logical antenna port 405-b. Although described as each containing eight symbols, any suitable number of symbols may be contained in the pilot sequences 410. Sets of symbols of the pilot sequences may be mapped to particular time and frequency domain resources for an uplink transmission 440. The mapping may correspond to a defined upsampling ratio, which may provide for repetition of output data symbols 440 in the time domain. For example, FIG. 4A illustrates an upsampling ratio of 2, indicating that output data symbols are repeated once.

After identifying the sets of symbols of pilot sequences 410-a and 410-b, transmission stream processors 220-a and 220-b may transform the sets of symbols from the time domain to the frequency domain using DFT components 415-a and 415-b, respectively, (e.g., via DFT spreading). The DFTs performed on the respective pilot sequences 410 may result in different frequency domain signals. For example, the frequency domain representation of pilot sequence 410-a may be distinct from the frequency domain representation of pilot sequence 410-b. These different DFT spread waveforms may then be transformed at one of IDFT components 420 from the frequency domain back to the time domain. Based on the subcarrier mapping at the inputs to IDFT components 420, the pilot sequences may be multiplexed to interleaved or interlaced frequency resources. In some examples, as illustrated, a signal processing scheme 400-a may support the use of separate IDFT components 420-a and 420-b for processing signals at logical antenna ports 405-a and 405-b. However, in other examples, multiple logical antenna ports 405 may share an IDFT component 420. After transforming the signals from the frequency domain to the time domain, CP adders 425-a and 425-b may append a cyclic prefix to the resulting waveforms. The CP-appended waveforms may subsequently be precoded using similar techniques to those described with reference to FIG. 3. By applying the precoding matrix to signals in the time domain, a transmission stream processor may apply the same precoding phasor to all tones of a given antenna port.

Subsequently, the output 435-a of transmission stream processor 220-a and the output 435-b of transmission stream processor 220-b may be combined for uplink transmission 440 via a single antenna. However, combining outputs 435 into a single uplink transmission 440 may result in an increased PAPR, as discussed with reference to FIG. 4C. Specifically, because the resulting uplink transmission 440 includes a combination of multiple single-carrier waveforms (e.g., a linear combination of multiple single-carrier waveforms), the resulting waveform of the uplink transmission may not maintain the low PAPR properties of the single-carrier waveforms. Accordingly, uplink transmission 440 may be distorted (e.g., based on the limited capabilities of a power amplifier within the antenna), or an increased maximum power reduction (MPR) value may have to be used to maintain amplifier output linearity, and a receiver (e.g., at a base station 105) may not be able to correctly decode the transmission. In some examples, transmission stream processors 220 may support techniques for reducing the PAPR of a reference signal waveforms transmitted via a single antenna.

Figure 4B:
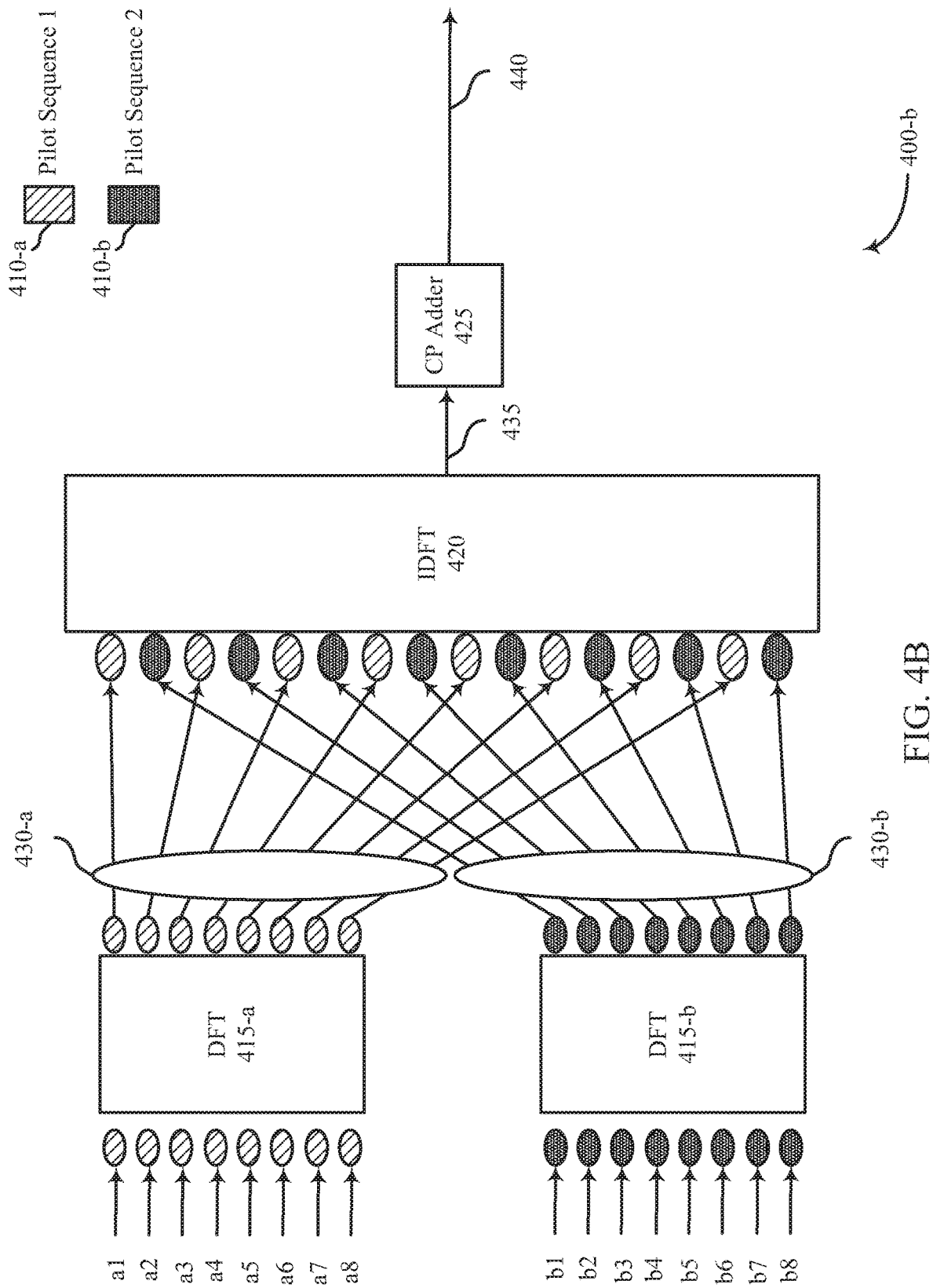

FIG. 4B illustrates an example of a signal processing scheme 400-b in a system. Signal processing scheme 400-b may be similar to signal processing scheme 400-a, except that, in signal processing scheme 400-b, precoding is applied in the frequency domain.

As described with reference to FIG. 4A, a transmission stream processor may transform pilot sequences 410-a and 410-b from the time domain to the frequency domain using respective DFT components 415-a, 415-b. In the present example, the frequency domain representation of pilot sequence 410-a may then be modified (e.g., phase shifting, amplitude modulation, etc.) by precoder 430-a while the frequency domain representation of pilot sequence 410-b may be modified by precoder 430-b. Subsequently, the frequency domain representations of the respective precoded pilot sequences 410 may be mapped to interleaved or interlaced subcarriers as described with reference to FIG. 4A. The precoded frequency domain signals may then be fed to the same IDFT component 420, which may convert the precoded frequency domain signals into a single output 435. The output 435 may have a cyclic prefix appended by CP adder 435 to generate the uplink transmission 440.

However, as described with reference to FIG. 4A, the resulting uplink transmission 440 may be associated with a high PAPR due to the combination of single carrier waveforms (i.e., pilot sequences 410). Some wireless communication systems may support techniques for reducing the PAPR of reference signal waveforms transmitted via a single antenna.

Figure 4C:
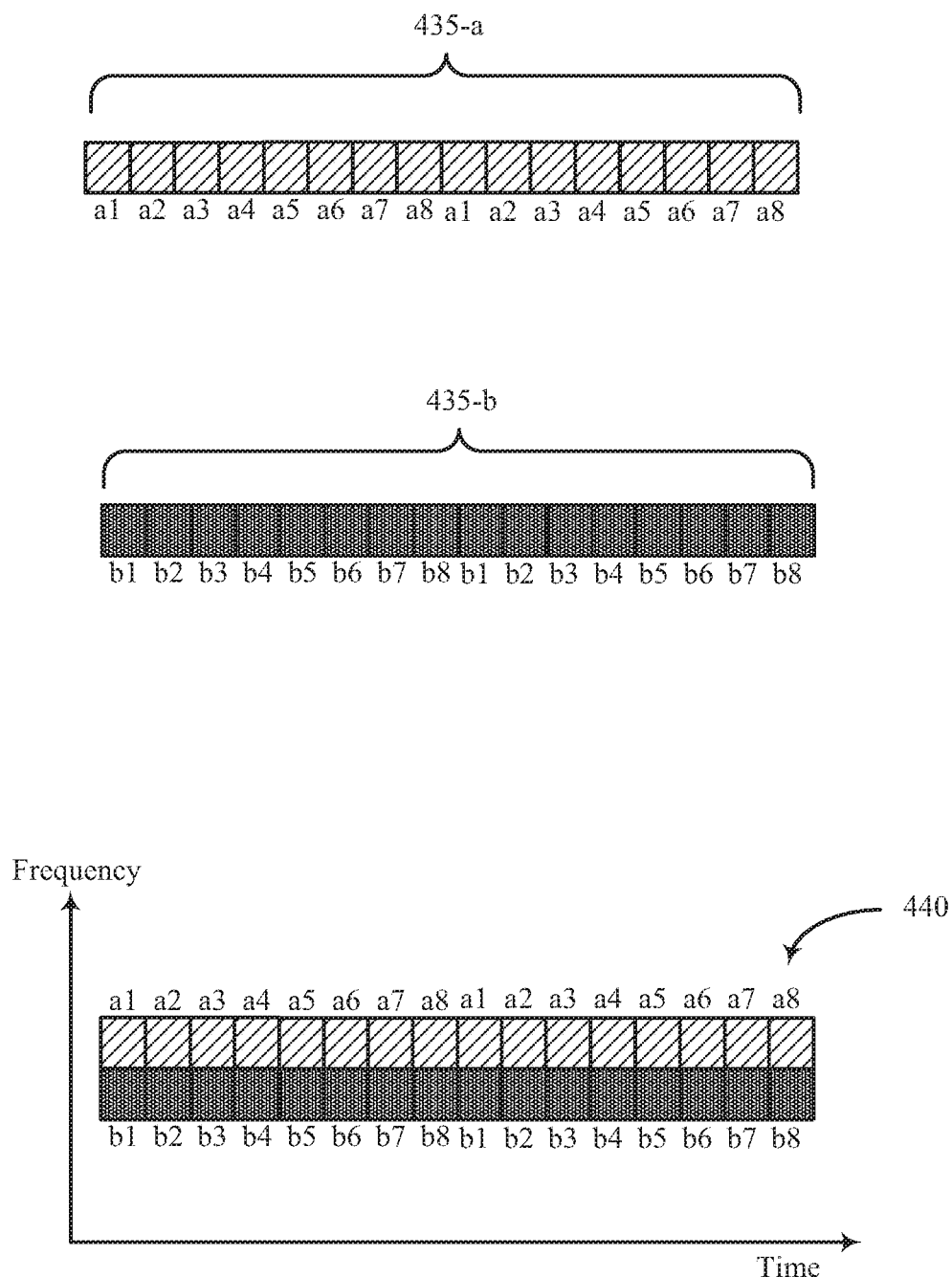
FIG. 4C illustrates an example of outputs of a signal processing scheme in a system that supports a low PAPR precoded reference signal design for MIMO transmissions in accordance with various aspects of the present disclosure.

FIG. 4C illustrates examples of outputs 435 of a transmission stream processor and an example of an uplink transmission 440 in a system. Outputs 435-a and 435-b may be examples of the corresponding outputs of transmission stream processors 220-a and 220-b respectively described with reference to FIG. 4A. Uplink transmission 440 may be an example of corresponding uplink transmissions described with reference to FIGS. 4A and 4B.

As described with reference to FIG. 4A, the respective pilot sequences 410 of FIGS. 4A and 4B may be upsampled in the frequency domain (e.g., may be mapped to alternating subcarriers). This upsampling in the frequency domain may manifest as repetitions of the sequence in respective outputs 435 (i.e., output 435-a may contain two iterations of pilot sequence 410-a and output 435-b may contain two iterations of pilot sequence 410-b). When the outputs 435 are combined (e.g., by some linear combination) into an uplink transmission 440, the low PAPR properties of outputs 435 may be compromised. That is, because output 435-a and output 435-b may be transmitted on the same time resources (e.g., because of the linear combination), the combined signal may have a higher PAPR than each signal individually. Some wireless communication systems may support techniques for reducing the PAPR of reference signal waveforms transmitted via a single antenna.

Figure 5A:
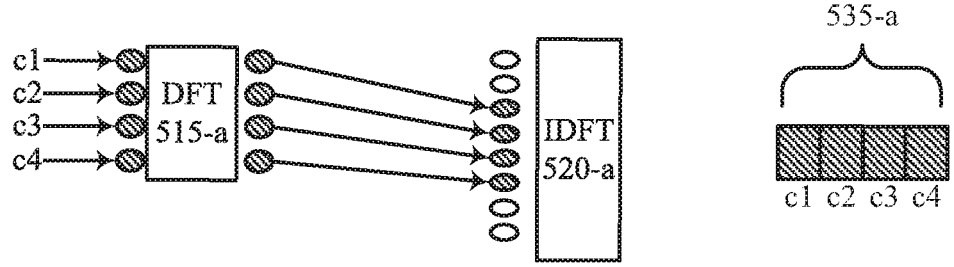
FIGS. 5A through 5C illustrate examples of outputs of a signal processing scheme in a system that supports a low PAPR precoded reference signal design for MIMO transmissions in accordance with various aspects of the present disclosure.
Figure 5B:
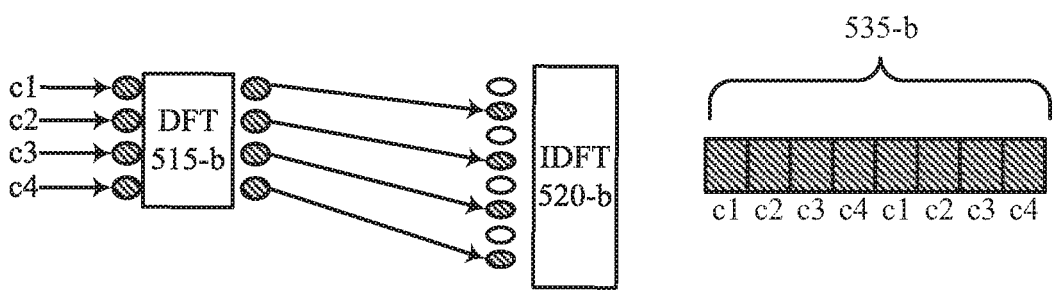
Figure 5C:
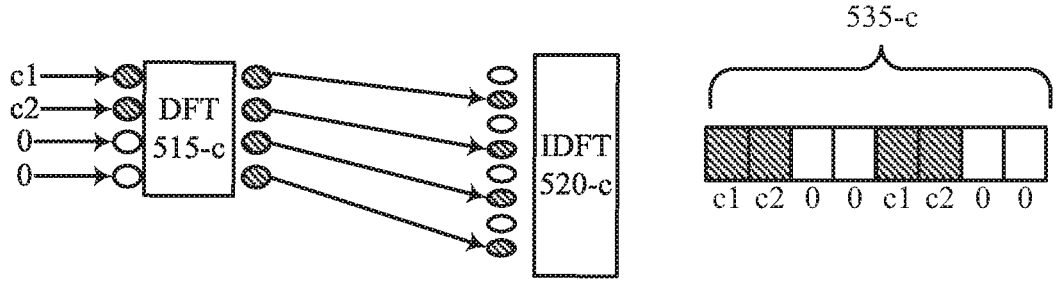

FIGS. 5A, 5B, and 5C illustrate examples of outputs 535 in a system that supports a low PAPR precoded reference signal design for MIMO transmissions in accordance with various aspects of the present disclosure. FIG. 5A displays a pilot sequence (e.g., symbols c1, c2, c3, and c4) as an input to DFT component 515-a. After the pilot sequence is converted from the time domain to the frequency domain by DFT component 515-a, the frequency domain representation of the pilot sequence is mapped to contiguous (i.e., consecutive) subcarriers before being transformed back into the time domain by IDFT component 520-a. Accordingly, in this example the upsampling ratio is one arid the pilot sequence is not repeated in output 535-a.

Alternatively, FIG. 5B illustrates the same pilot sequence (e.g., symbols c1, c2, c3, and c4) as an input to DFT component 515-b. After the pilot sequence is converted from the time domain to the frequency domain by DFT component 515-b, the frequency domain representation of the pilot sequence is mapped to alternating subcarriers before being transformed back into the time domain. Because the frequency domain representation of the pilot sequence is mapped to alternating subcarriers before being transformed back to the time domain by IDFT component 520-b, the upsampling ratio in this example is two (2) such that the pilot sequence is repeated once in output 535-b.

FIG. 5C illustrates yet another example in which a pilot sequence comprising symbols c1 and c2 is an input to DFT component 515-c. In this example, a transmission stream processor may append zeros (e.g., null symbols) to the end of the pilot sequence (e.g., zero-padding) before transforming the time domain pilot sequence to the frequency domain using DFT component 515-c. Subsequently, the frequency domain representation of the pilot sequence is mapped to alternating subcarriers. Because of this mapping, the resulting output 535-c of IDFT component 520-c contains a repeated signal (e.g., upsampling ratio of two (2)). Additionally, the symbols of output 535-c may be separated in the time domain due to the zero-padding applied to the pilot sequence.

Figure 5D:
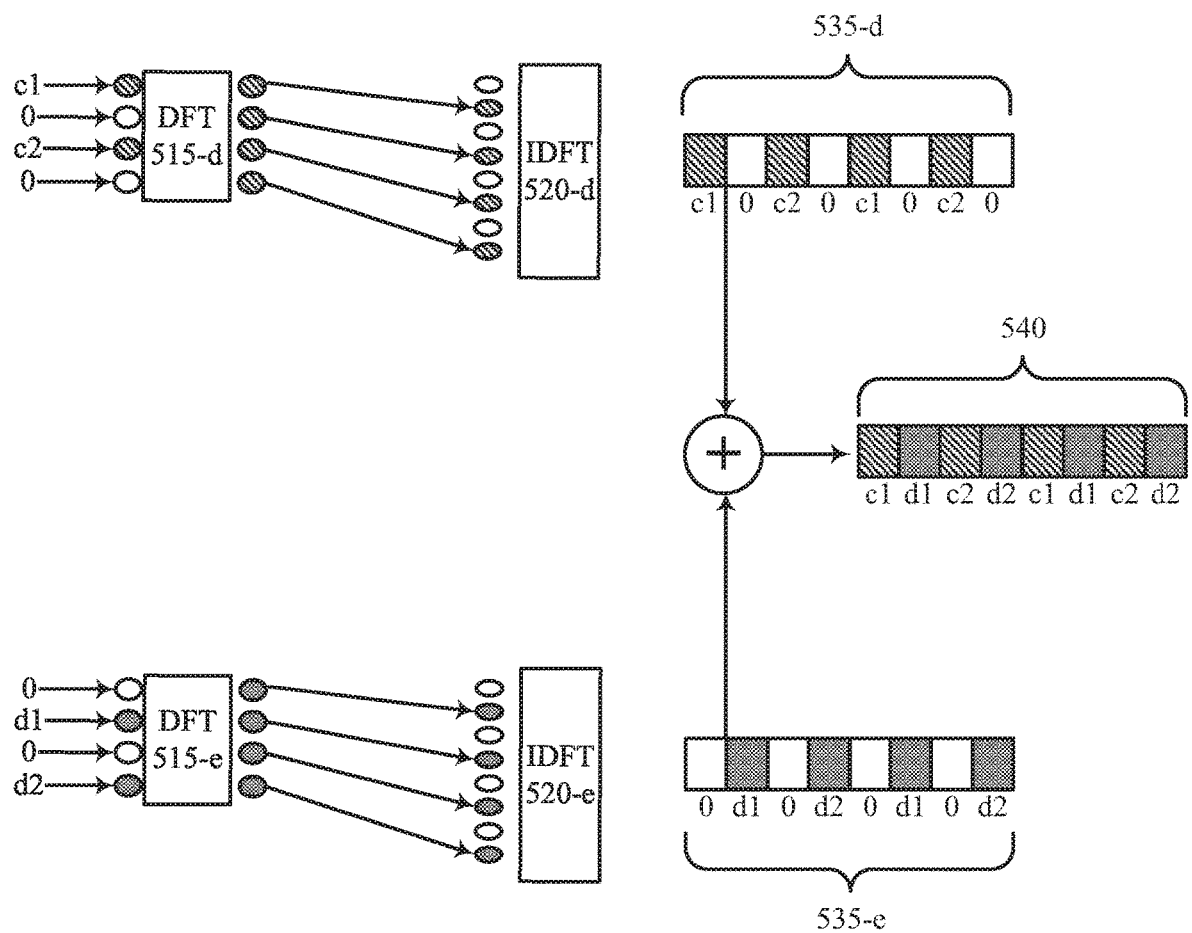
FIG. 5D illustrates an example of outputs of a signal processing scheme and a resulting uplink transmission in a system that supports a low PAPR precoded reference signal design for MIMO transmissions in accordance with various aspects of the present disclosure.

FIG. 5D illustrates examples of outputs 535-d and 535-e and an uplink transmission 540 in a system that supports a low PAPR precoded reference signal design for MIMO transmissions in accordance with various aspects of the present disclosure. FIG. 5D illustrates two pilot sequences as inputs to respective DFT components 515, each pilot sequence containing two symbols (e.g. a first pilot sequence with symbols c1 and c2 and a second pilot sequence with symbols d1 and d2) along with two zeros (e.g., two null data points or symbols). As described with reference to FIG. 5C, the inclusion of null data points in the pilot sequences and the subcarrier mapping in the frequency domain contribute to forming the respective outputs 535-d and 535-e. Because of the complementary designs of the two sequences and subcarrier mappings, outputs 535-d and 535-e may be combined into a single uplink transmission 540 with a low PAPR. Specifically, because outputs 535-d and 535-e are mapped to orthogonal time resources, the uplink transmission 540 may have a low PAPR (e.g., substantially the same as a single carrier waveform).

In aspects of the present disclosure, any orthogonal pattern across ports may allow for a low PAPR multiplexed signal to be generated using the techniques described herein. In some cases, it may be desirable to have equal spacing far the tones (e.g., subcarriers) to ensure appropriate frequency domain PAPR properties (e.g., when the time domain sequence is a Chu sequence). Uplink signal 540 may be referred to as an interlaced pattern in the time domain while the uplink signal 640 described below with reference to FIG. 6 may be referred to as a block pattern in the time domain. In some cases (e.g., when the absolute values of the precoders used for the input sequences are different), the interlaced pattern may result in different amplitudes for every other symbol in the uplink transmission 540. Additionally, in some cases, the interlaced pattern may preclude the wireless communications system from achieving multi-user orthogonality as described below (e.g., with reference to FIG. 12).

Figure 6A:
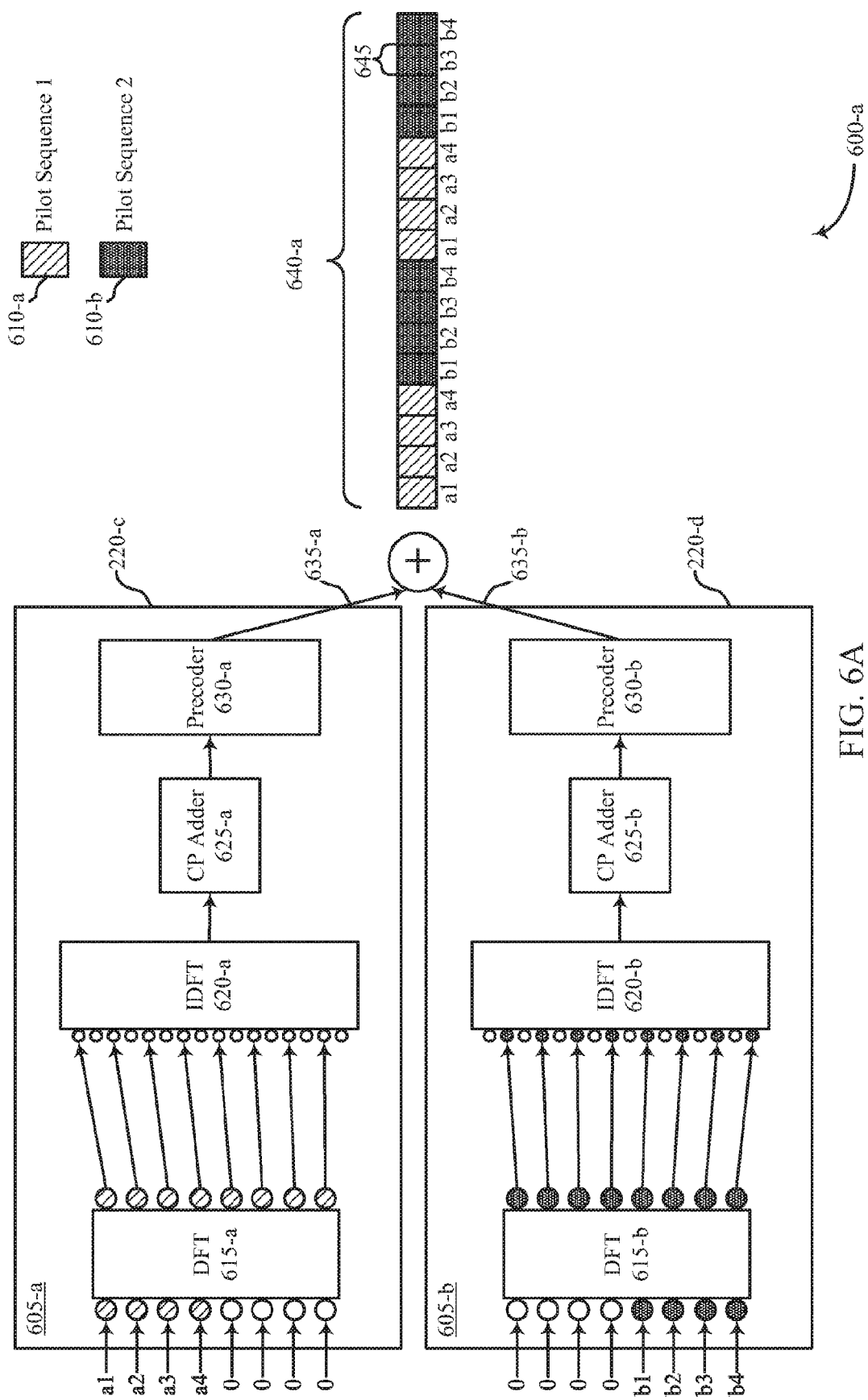
FIGS. 6A through 12B illustrate examples of signal processing schemes in a system that supports a low PAPR precoded reference signal design for MIMO transmissions in accordance with various aspects of the present disclosure.

FIG. 6A illustrates an example of a signal processing scheme 600-a that supports a low PAPR precoded reference signal design for MIMO transmissions in accordance with various aspects of the present disclosure. Techniques described with reference to FIG. 6A may be performed at a UE 115, which may be an example of the corresponding device described with reference to FIGS. 1 through 4. In some cases, opposite but complementary techniques to those described with reference to FIG. 6A may be performed by a base station 105, as described with reference to FIGS. 1 and 2.

Signal processing scheme 600-a illustrates two logical antenna ports 605-a and 605-b, each with a respective pilot sequence 610-a and 610-b. In the present example, the outputs of the signal processing scheme used to process signals at each of logical antenna ports 605-a and 605-b are fed to a single physical antenna (not shown, but which may be an example of the corresponding components described with reference to FIGS. 2 and 3). It is to be understood that more than two logical antenna ports 605 may be used in accordance with the present example, and that each antenna port 605 may be connected to one or more physical antennas. Signal processing scheme 600-a may include processes performed by a transmission stream processor 220-c at antenna port 605-a and processes performed by a transmission stream processor 220-d at antenna port 605-b. Transmission stream processors 220-c and 220-d may each include one or more DFT components 615, one or more IDFT components 620, one or more CP adders 625, and one or more precoders 630. These components may be used to process reference signals (e.g., pilot sequences 610) for an uplink transmission 640-a.

In the present example, pilot sequence 610-a may include a set of symbols (e.g., four symbols identified as a1 through a4 as illustrated) and may serve as an input to transmission stream processor 220-c. Similarly, pilot sequence 610-b may include a set of symbols (e.g., four symbols identified as b1 through b4) and may serve as an input to transmission stream processor 220-d. The original time domain sequences (e.g. pilot sequences 610-a and 610-b) may be obtained in a variety of ways in accordance with the present disclosure. In one example, the UE 115 may generate a proper length (e.g., depending on the number of allocated time slots) Chu sequence. The proper length may be obtained by truncation and/or extension (e.g., extension by appending zeroes to the sequence).

In some cases, the proper length Chu sequence may be repeated, upsampled, interpolated, or downsampled (e.g., with a proper pattern which corresponds to the time resource allocation) in the frequency domain. As an example, pilot sequence 610-*a* may be generated by taking the IDFT of a frequency domain sequence containing eight points (e.g., f1, g1, f2, g2, f3, g3, f4, g4) where f1, f2, f3, and f4 are appropriately selected complex numbers and the sequence g1, g2, g3, g4 is an interpolation sequence. The interpolation sequence g1, g2, g3, g4 may be generated by upsampling (or interpolating) the sequence f1, f2, f3, f4 with an upsampling ratio of two (2). After the proper sequence has been generated in the frequency domain, the UE 115 may take the IDFT of the sequence to obtain the desired input time domain sequence (i.e., pilot sequences 610-*a* and 610-*b*). Alternatively, since the fast Fourier transform (FFT) of a Chu sequence is also a Chu sequence (e.g., with or without conjugates), the UE 115 may generate the proper length Chu sequence (with or without conjugates) by truncation and/or extension as described above. The generated Chu sequence may then be used as the time domain sequence.

Once the time domain pilot sequences are obtained, sets of symbols of the pilot sequences may be mapped to particular time and frequency domain resources for an uplink transmission 640-*a*. The mapping may correspond to a defined upsampling ratio, which may provide for repetition of output data symbols 645 in the time domain. In the example of FIG. 6A, since only half of the number of allocated time slots are assigned to symbols of the pilot sequences 610, a repetition pattern may be observed in the frequency domain. In some cases, mapping to half of the number of allocated time slots may reduce the throughput capacity, which may impact data transmission (e.g., but may not matter for a pilot sequence). The present example illustrates an upsampling ratio of 2 (e.g., as a result of the subcarrier mapping as described with reference to FIGS. 5B-5D), indicating that output data symbols 645 are repeated once in the uplink transmission 640-*a*.

Because the input symbols are allocated to subsets of time resources (e.g., prior to transforming the signals to the time domain at DFT 615) and the frequency domain representations of the respective input sequences are allocated to subsets of frequency resources (e.g., to alternating subcarriers), the respective outputs 635 may be combined into a single uplink transmission 640-*a* with a low PAPR. Accordingly, a single antenna (not shown) may transmit an uplink transmission 640-*a* such that it may be successfully received and decoded (e.g., using opposite but complementary techniques) at a receiver (e.g., a base station 105). In some cases, a second antenna may transmit a complementary uplink transmission to support MIMO techniques, as described with reference to FIG. 2. The second antenna may be connected to (e.g., two) transmission stream processors similar (e.g., containing the same or similar components) to transmission stream processors 220-*c* and 220-*d*. However, within the second set of transmission stream processors, different precoders may be applied to pilot sequences 610-*a* and 610-*b* (e.g., corresponding to precoding phasors 315-*b* and 315-*d* described with reference to FIG. 3). The second set of transmission stream processors may also be associated with respective antenna ports 605-*a* and 605-*b*.

In the present example, precoding is applied at respective precoders 630-*a*, 630-*b* in the time domain. However, as described with reference to FIG. 4B, precoding may additionally or alternatively be applied in the frequency domain. In some cases, if precoding is applied in the frequency domain, a different precoder may be applied to different tones (e.g., to different subcarriers). In some cases, the precoders 630-*a* and 630-*b* may be selected such that the weights associated with the precoders have the same magnitude (e.g., or magnitude values within a tolerable range of each other) to appropriately bound the PAPR of uplink signal 640-*a*.

Figure 6B:
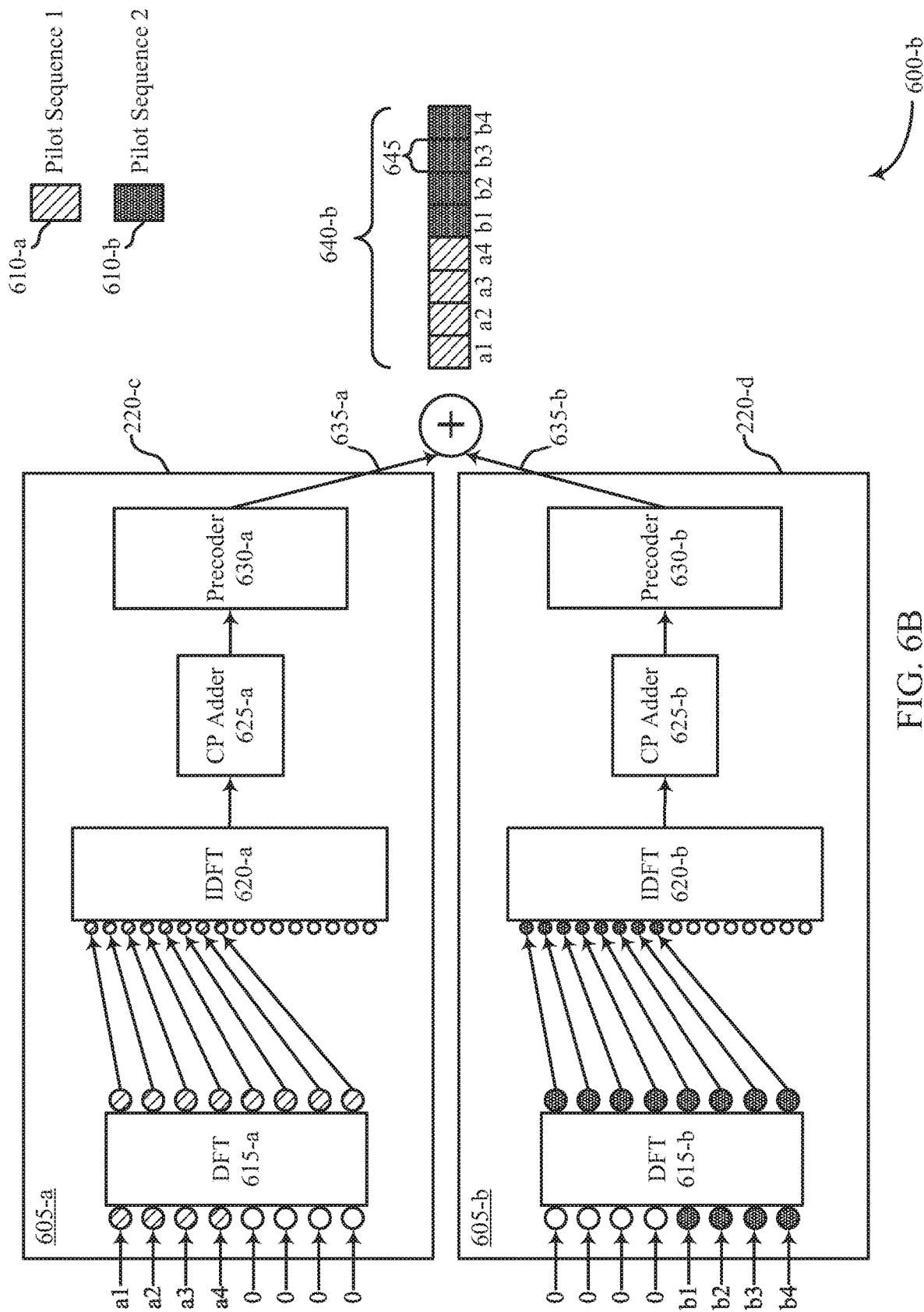

FIG. 6B illustrates an example of a signal processing scheme 600-*b* that supports a low PAPR precoded reference signal design for MIMO transmissions in accordance with various aspects of the present disclosure. Techniques described with reference to FIG. 6 may be performed at a UE 115, which may be an example of the corresponding device described with reference to FIGS. 1 through 4. In some cases, opposite but complementary techniques to those described with reference to FIG. 6B may be performed by a base station 105, as described with reference to FIGS. 1 and 2.

Signal processing scheme 600-*b* illustrates two logical antenna ports 605-*a* and 605-*b*, each with a respective pilot sequence 610-*a* and 610-*b*. In the present example, the outputs of the signal processing scheme used to process signals at each of logical antenna ports 605-*a* and 605-*b* are fed to a single physical antenna (not shown, but which may be an example of the corresponding components described with reference to FIGS. 2 and 3). It is to be understood that more than two logical antenna ports 605 may be used in accordance with the present example, and that each antenna port 605 may be connected to one or more physical antennas. Signal processing scheme 600-*b* may include processes performed by a transmission stream processor 220-*c* at antenna port 605-*a* and processes performed by a transmission stream processor 220-*d* at antenna port 605-*b*. Transmission stream processors 220-*c* and 220-*d* may each include one or more DFT components 615, one or more IDFT components 620, one or more CP adders 625, and one or more precoders 630. These components may be used to process reference signals (e.g., pilot sequences 610) for an uplink transmission 640-*b*.

In the present example, pilot sequence 610-*a* may include a set of symbols (e.g., four symbols identified as a1 through a4 as illustrated) and may serve as an input to transmission stream processor 220-*c*. Similarly, pilot sequence 610-*b* may include a set of symbols (e.g., four symbols identified as b1 through b4) and may serve as an input to transmission stream processor 220-*d*. The original time domain sequences (e.g. pilot sequences 610-*a* and 610-*b*) may be obtained in a variety of ways in accordance with the present disclosure as discussed with reference to FIG. 6A.

Once the time domain pilot sequences are obtained, sets of symbols of the pilot sequences may be mapped to particular time and frequency domain resources for an uplink transmission 640-*b*. The mapping may correspond to a defined upsampling ratio, which may provide for repetition of output data symbols 645 in the time domain. The present example illustrates an upsampling ratio of 1 (e.g., as a result of the subcarrier mapping as described with reference to FIGS. 5B-5D), indicating that output data symbols 645 are not repeated in the uplink transmission 640-*b*.

As illustrated, the input symbols are allocated to subsets of time resources, and, after the signals are transformed to the frequency domain at respective DFT components 615-*a*, 615-*b*, the frequency domain representations of the respective input sequences are allocated to the same frequency resources. However, because the input symbols are allocated to subsets of time resources, the respective outputs 635-*a*, 635-*b* may be combined into a single uplink transmission 640-*b* with a low PAPR. Accordingly, a single antenna (not shown) may transmit an uplink transmission 640-*b* such that it may be successfully received and decoded (e.g., using opposite but complementary techniques) at a receiver (e.g., a base station 105). In some cases, a second antenna may transmit a complementary uplink transmission to support of MIMO techniques, as described with reference to FIG. 2. The second antenna may be connected to (e.g., two) transmission stream processors similar (e.g., containing the same or similar components) to transmission stream processors 220-c and 220-d. However, within the second set of transmission stream processors, different precoders may be applied to pilot sequences 610-a and 610-b (e.g., corresponding to precoding phasors 315-b and 315-d described with reference to FIG. 3). The second set of transmission stream processors may also be associated with respective antenna ports 605-a and 605-b.

In the present example, precoding is applied at respective precoders 630-a, 630-b in the time domain. However, as described with reference to FIG. 4B, precoding may additionally or alternatively be applied in the frequency domain. In some cases, if precoding is applied in the frequency domain, a different precoder may be applied to different tones (e.g., to different subcarriers). In some cases, the precoders 630-a and 630-b may be selected such that the weights associated with the precoders have the same magnitude (e.g., or magnitude values within a tolerable range of each other) so that the PAPR of uplink signal 640-b may be appropriately bounded.

Figure 6C:
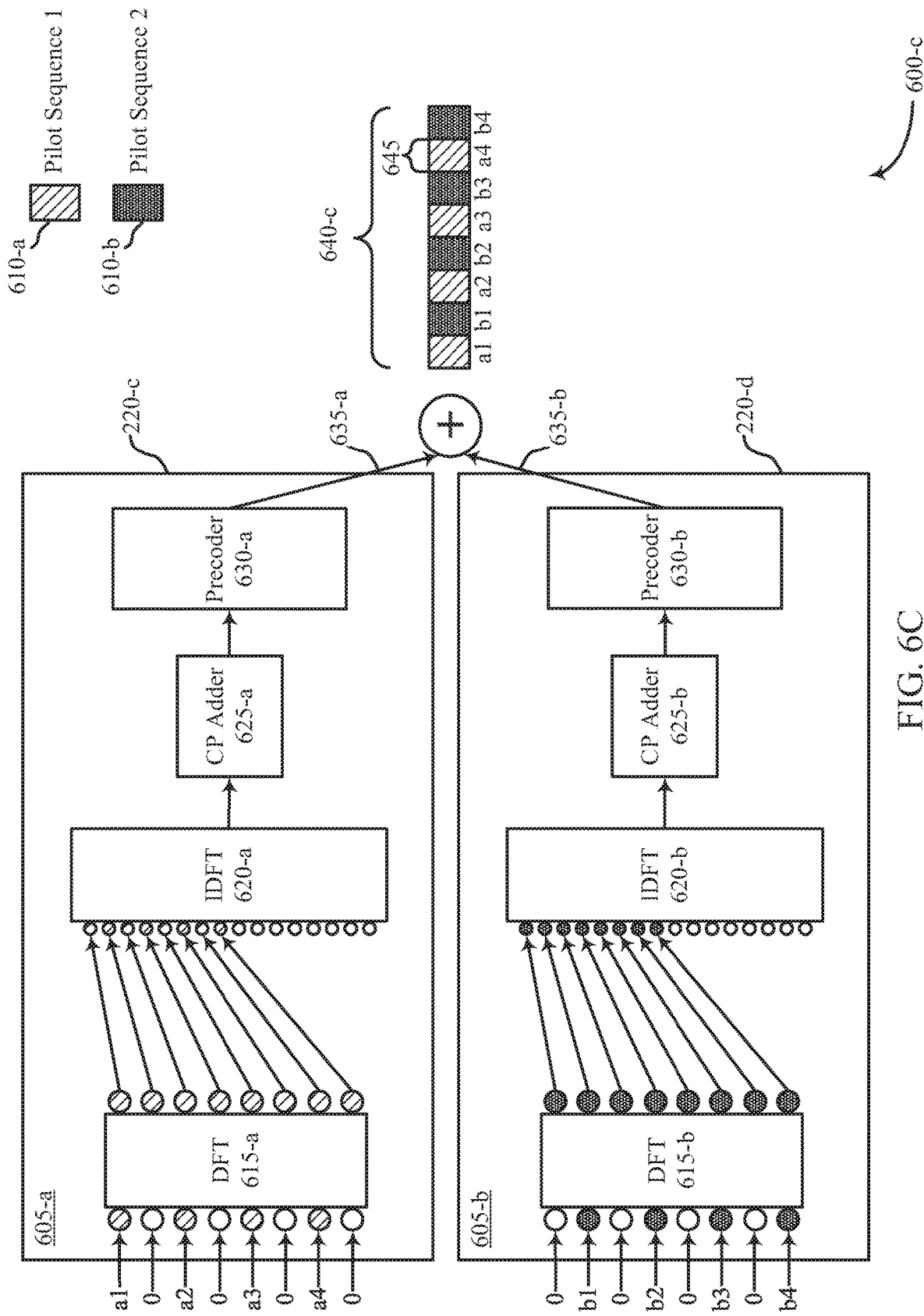

FIG. 6C illustrates an example of a signal processing scheme 600-c that supports a low PAPR precoded reference signal design for MIMO transmissions in accordance with various aspects of the present disclosure. Techniques described with reference to FIG. 6C may be performed at a UE 115, which may be an example of the corresponding device described with reference to FIGS. 1 through 4. In some cases, opposite but complementary techniques to those described with reference to FIG. 6C may be performed by a base station 105, as described with reference to FIGS. 1 and 2.

Signal processing scheme 600-c illustrates two logical antenna ports 605-a and 605-b, each with a respective pilot sequence 610-a and 610-b. In the present example, the outputs of the signal processing scheme used to process signals at each of logical antenna ports 605-a and 605-b are fed to a single physical antenna (not shown, but which may be an example of the corresponding components described with reference to FIGS. 2 and 3). It is to be understood that more than two logical antenna ports 605 may be used in accordance with the present example, and that each antenna port 605 may be connected to one or more physical antennas. Signal processing scheme 600-c may include processes performed by a transmission stream processor 220-c at antenna port 605-a and processes performed by a transmission stream processor 220-d at antenna port 605-b. Transmission stream processors 220-c and 220-d may each include one or more OFT components 615, one or more IDFT components 620, one or more CP adders 625, and one or more precoders 630. These components may be used to process reference signals (e.g., pilot sequences 610) for an uplink transmission 640-c.

In the present example, pilot sequence 610-a may include a set of symbols (e.g., four symbols identified as a1 through a4 as illustrated) and may serve as an input to transmission stream processor 220-c. Similarly, pilot sequence 610-b may include a set of symbols (e.g., four symbols identified as b1 through b4) and may serve as an input to transmission stream processor 220-d. The original time domain sequences (e.g. pilot sequences 610-a and 610-b) may be obtained in a variety of ways in accordance with the present disclosure as discussed with reference to FIG. 6A.

Once the time domain pilot sequences are obtained, sets of symbols of the pilot sequences may be mapped to particular time and frequency domain resources for an uplink transmission 640-c. The mapping may correspond to a defined upsampling ratio, which may provide for repetition of output data symbols 645 in the time domain. The present example illustrates an upsampling ratio of 1 (e.g., as a result of the subcarrier mapping as described with reference to FIGS. 5B-5D), indicating that output data symbols 645 are not repeated in the uplink transmission 640-c.

As illustrated, the input symbols are allocated to subsets of time resources (e.g., interleaved time slots), and, after the signals are transformed to the frequency domain at respective DFT components 615-a, 615-b, the frequency domain representations of the respective input sequences are allocated to the same frequency resources. However, because the input symbols are allocated to subsets of time resources, the respective outputs 635-a, 635-b may be combined into a single uplink transmission 640-c with a low PAPR. Accordingly, a single antenna (not shown) may transmit an uplink transmission 640-c such that it may be successfully received and decoded (e.g., using opposite but complementary techniques) at a receiver (e.g., a base station 105). In some cases, a second antenna may transmit a complementary uplink transmission to support of MIMO techniques, as described with reference to FIG. 2. The second antenna may be connected to (e.g., two) transmission stream processors similar (e.g., containing the same or similar components) to transmission stream processors 220-c and 220-d. However, within the second set of transmission stream processors, different precoders may be applied to pilot sequences 610-a and 610-b (e.g., corresponding to precoding phasors 315-b and 315-d described with reference to FIG. 3). The second set of transmission stream processors may also be associated with respective antenna ports 605-a and 605-b.

In the present example, precoding is applied at respective precoders 630 in the time domain. However, as described with reference to FIG. 4B, precoding may additionally or alternatively be applied in the frequency domain. In some cases, if precoding is applied in the frequency domain, a different precoder may be applied to different tones (e.g., to different subcarriers). In some cases, the precoders 630-a and 630-b may be selected such that the weights associated with the precoders have the same magnitude (e.g., or magnitude values within a tolerable range of each other) so that the PAPR of uplink signal 640-c may be appropriately bounded.

Figure 7:
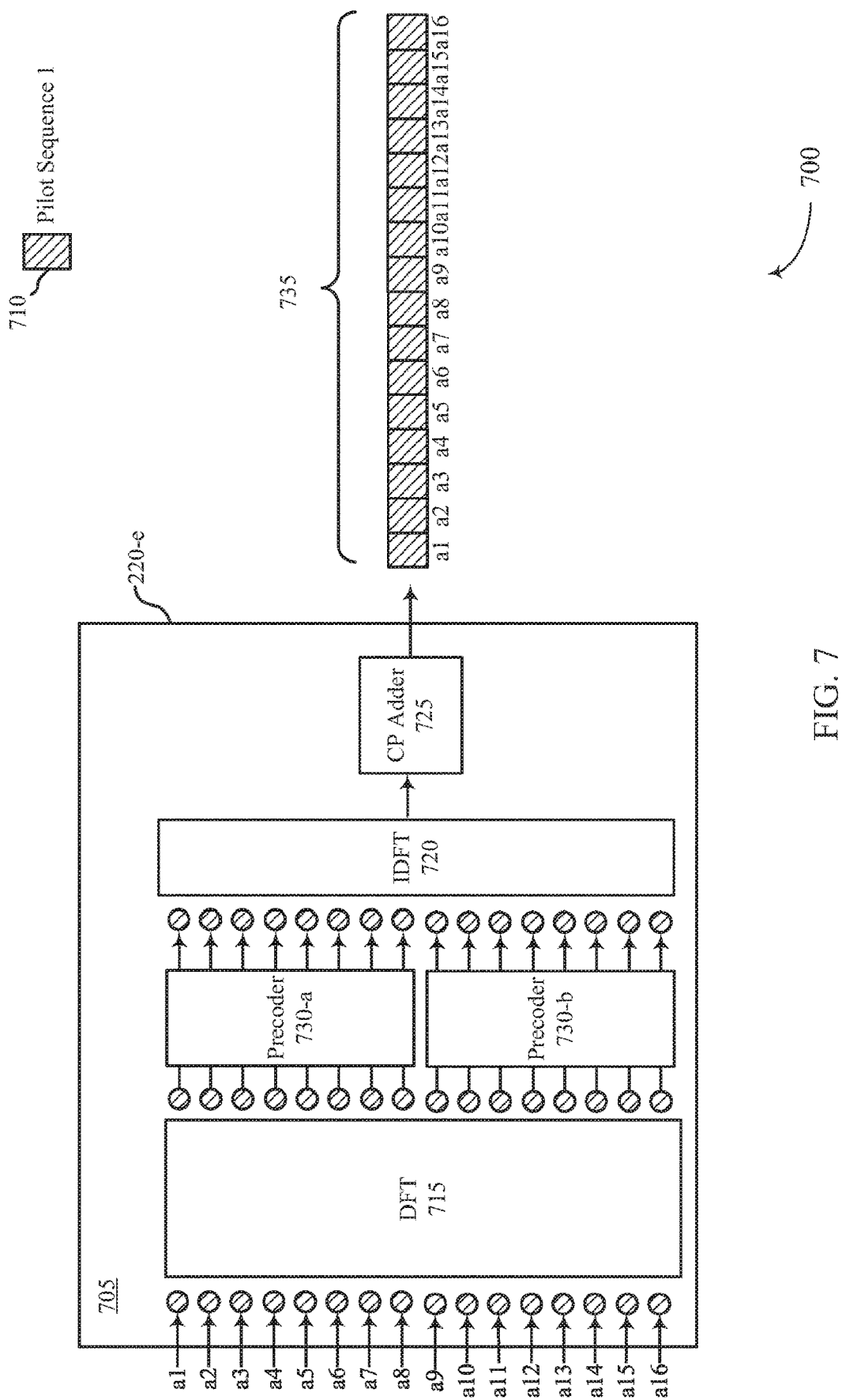

FIG. 7 illustrates an example of a signal processing scheme 700. Techniques described with reference to FIG. 7 may be performed at a UE 115, which may be an example of the corresponding device described with reference to FIGS. 1 through 3. In some cases, opposite but complementary techniques to those described with reference to FIG. 7 may be performed by a base station 105, as described with reference to FIGS. 1 and 2.

Signal processing scheme 700 illustrates one logical antenna port 705 with a respective pilot sequence 710. In the present example, the output of signal processing scheme 700 is fed to a single physical antenna (not shown, but which may be an example of the corresponding components described with reference to FIGS. 2 and 3). In some cases, antenna port 705 may be connected to one or more physical antennas. Signal processing scheme 700 may include processes performed by a transmission stream processor 220-e at antenna port 705. Transmission stream processor 220-e may include DFT component 715, IDFT component 720, CP adder 725, and one or more precoders 730. These components may be used to process reference signals (e.g., pilot sequence 710) for an uplink transmission 735.

In the present example, pilot sequence 710 includes a set of symbols (e.g., sixteen symbols identified as a1 through a16 as illustrated) and may serve as input to transmission stream processor 220-e. Any suitable number of symbols may be contained in the pilot sequence 710. Sets of symbols of the pilot sequence 710 may be mapped to particular time and frequency domain resources for an uplink transmission 735. The mapping may correspond to a defined upsampling ratio, which may provide for repetition of output data symbols in the time domain. For example, FIG. 7 illustrates an upsampling ratio of 1, indicating that output data symbols are not repeated.

As illustrated, precoders 730-a and 730-b may be applied to different sub-bands (e.g., to different sets of subcarriers) in the frequency domain. However, because different precoders 730 are applied to different portions of the frequency domain representation of pilot sequence 710, the resulting uplink transmission 735 may not be a single carrier waveform even for a single antenna port 705. As a result, uplink transmission 735 may have a high PAPR. Accordingly, improved techniques for supporting the use of different precoders on different frequency bands (e.g., which may be referred to as sub-band precoding) may be desired.

Figure 8:
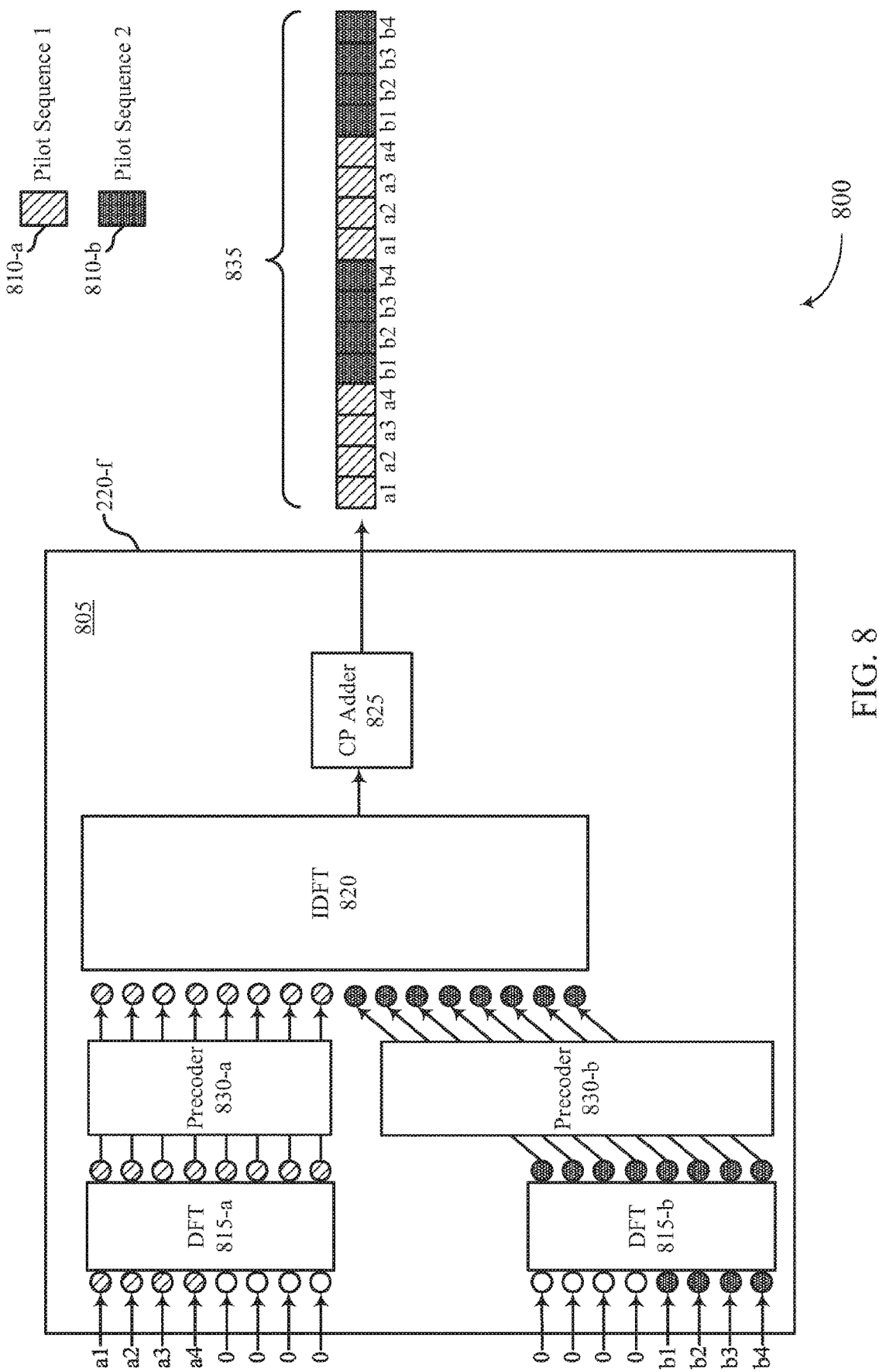

FIG. 8 illustrates an example of a signal processing scheme 800 in a system that supports a low PAPR precoded reference signal design for MIMO transmissions in accordance with various aspects of the present disclosure. Techniques described with reference to FIG. 8 may be performed at a UE 115, which may be an example of the corresponding device described with reference to FIGS. 1 through 3. In some cases, opposite but complementary techniques to those described with reference to FIG. 8 may be performed by a base station 105, as described with reference to FIGS. 1 and 2. FIG. 8 may support single port sub-band precoding in accordance with aspects of the present disclosure.

Signal processing scheme 800 illustrates one logical antenna port 805 with two respective pilots sequences 810-a and 810-b. In the present example, the output of signal processing scheme 800 is fed to a single physical antenna (not shown, but which may be an example of the corresponding components described with reference to FIGS. 2 and 3). In some cases, antenna port 805 may be connected to one or more physical antennas. Signal processing scheme 800 may include processes performed by a transmission stream processor 220-f at antenna port 805. Transmission stream processor 220-f may include DFT components 815-a and 815-b, IDFT component 820, CP adder 825, and precoders 830-a and 830-b. These components may be used to process reference signals (e.g., the respective pilot sequences 810) for an uplink transmission 835.

Signal processing scheme 800 may resemble aspects of signal processing scheme 400-b described with reference to FIG. 4B, except that the present example may be described with reference to a single logical antenna port 805 (e.g., as described with reference to FIG. 7), and the respective pilot sequences 810-a and 810-b may be allocated to different (e.g., orthogonal) subsets of time resources (e.g., as described with reference to FIG. 6). Accordingly, in the present example, transmission stream processor 220-f may map the pilot sequences 810-a and 810-b to respective subsets of time slots, and DFT components 815-a and 815-b may be used to transform the time domain pilot sequences 810-a and 810-b to respective frequency domain representations. Transmission stream processor may then map the frequency domain signals to a set of subcarriers, transform the mapped frequency domain signals to the time domain using IDFT component 820, and append a cyclic prefix to the output of IDFT component 820 using CP adder 825. By mapping the pilot sequences to respective subsets of time slots, transmission stream processor may ensure that the resulting uplink transmission 835 has a low PAPR.

Figure 9:
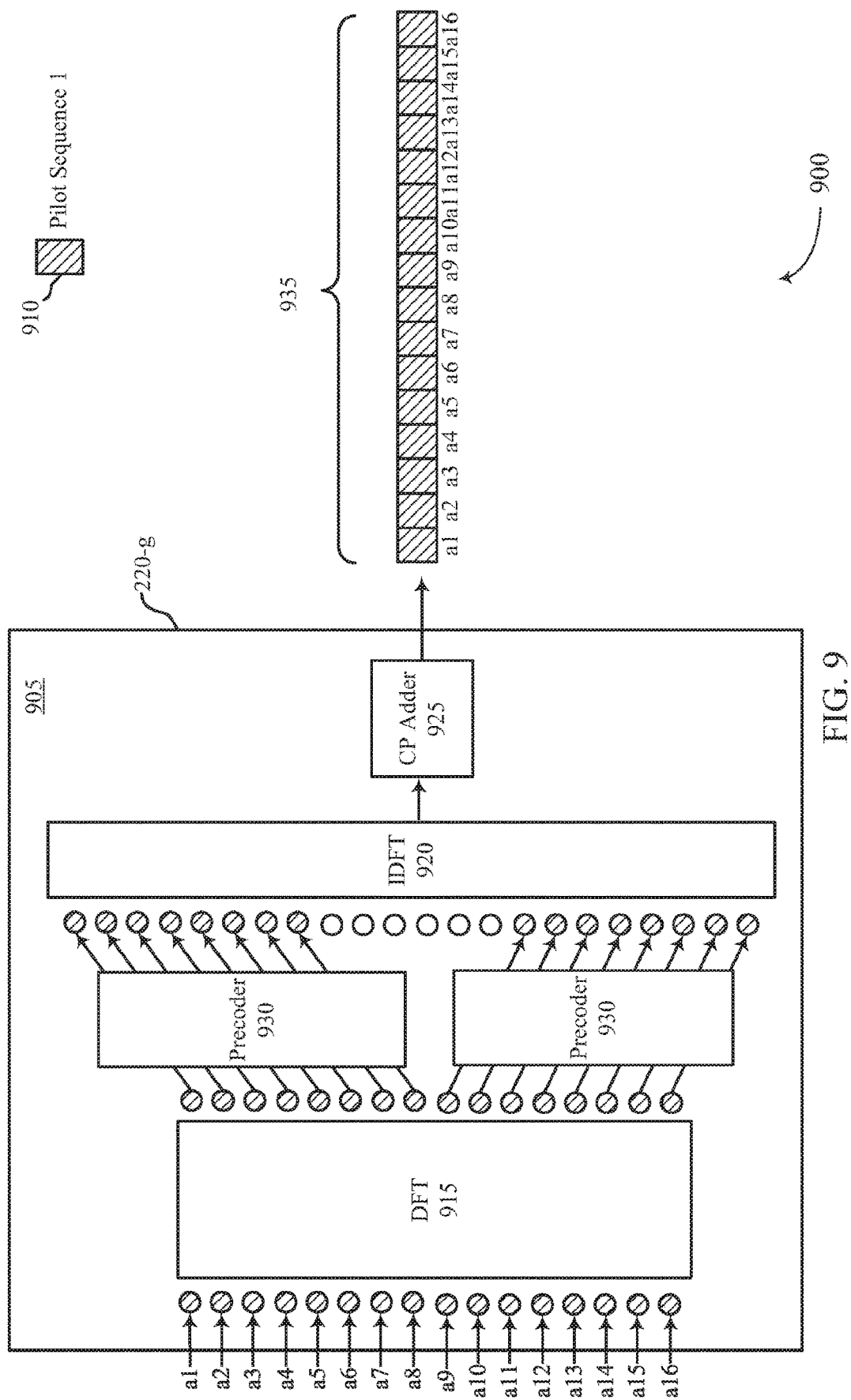

FIG. 9 illustrates an example of a signal processing scheme 900. Techniques described with reference to FIG. 9 may be performed at a UE 115, which may be an example of the corresponding device described with reference to FIGS. 1 through 3. In some cases, opposite but complementary techniques may be performed by a base station 105, as described with reference to FIGS. 1 and 2.

Signal processing scheme 900 illustrates one logical antenna port 905 with a respective pilot sequence 910. In the present example, the output of signal processing scheme 900 is fed to a single physical antenna (not shown, but which may be an example of the corresponding components described with reference to FIGS. 2 and 3). In some cases, antenna port 905 may be connected to one or more physical antennas. Signal processing scheme 900 may include processes performed by a transmission stream processor 220-g at antenna port 905. Transmission stream processor 220-g may include DFT component 915, IDFT component 920, CP adder 925, and a precoder 930. These components may be used to process reference signals (e.g., pilot sequence 910) for an uplink transmission 935.

In the present example, pilot sequence 910 includes a set of symbols (e.g., sixteen symbols identified as a1 through a16 as illustrated) and may serve as input to transmission stream processor 220-g. Any suitable number of symbols may be contained in the pilot sequence 910. Sets of symbols of the pilot sequence 910 may be mapped to particular time and frequency domain resources for an uplink transmission 935. The mapping may correspond to a defined upsampling ratio, which may provide for repetition of output data symbols in the time domain. For example, FIG. 9 illustrates an upsampling ratio of 1, indicating that output data symbols are not repeated.

As illustrated, precoder 930 may be applied to different sub-bands (e.g., to different sets of subcarriers) in the frequency domain. However, even though the same precoder 930 is applied to different portions of the frequency domain representation of pilot sequence 910, the resulting uplink transmission may not be single carrier even for a single logical port 905 (e.g., because symbols of the reference signal are mapped to non-contiguous frequency bands). As a result, uplink transmission 935 may have a high PAPR. Accordingly, improved techniques to support the use of a single precoder for signals mapped to non-contiguous frequency bands (e.g., multi-sub-band precoding) may be desired.

Figure 10:
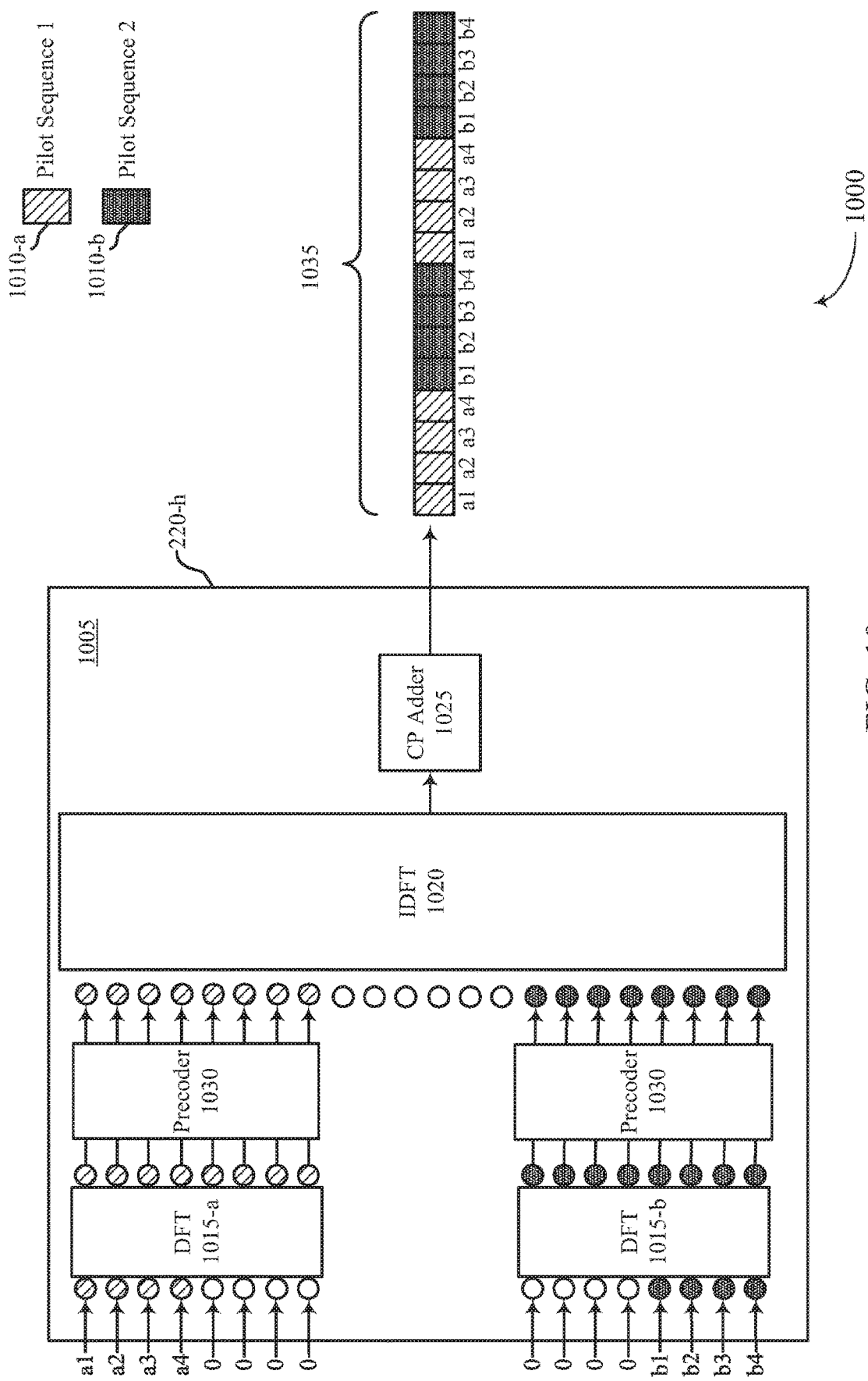

FIC. 10 illustrates an example of a signal processing scheme 1000 in a system that supports a low PAPR preceded reference signal design for MIMO transmissions in accordance with various aspects of the present disclosure. Techniques described with reference to FIG. 10 may be performed at a UE 115, which may be an example of the corresponding device described with reference to FIGS. 1 through 3. In some cases, opposite but complementary techniques to those described with reference to FIG. 10 may be performed by a base station 105, as described with reference to FIGS. 1 and 2. FIG. 10 may support single port multi-sub-band preceding in accordance with aspects of the present disclosure.

Signal processing scheme 1000 illustrates one logical antenna port 1005 with two respective pilots sequence 1010-*a* and 1010-*b*. In the present example, the output of signal processing scheme 1000 is fed to a single physical antenna (not shown, but which may be an example of the corresponding components described with reference to FIGS. 2 and 3). In some cases, antenna port 1005 may be connected to one or more physical antennas. Signal processing scheme 1000 may include processes performed by a transmission stream processor 220-*h*. Transmission stream processor 220-*h* may include DFT components 1015-*a* and 1015-*b*, IDFT component 1020, CP adder 1025, and precoder 1030. These components may be used to process reference signals (e.g., the respective pilot sequences 1010) for an uplink transmission 1035.

Signal processing scheme 1000 may resemble aspects of signal processing scheme 400-*b* described with reference to FIG. 4B, except that the present example may be described with reference to a single logical antenna port 1005 (e.g., as described with reference to FIG. 7), and the respective pilot sequences 1010-*a* and 1010-*b* may be allocated to orthogonal resources in time (e.g., as described with reference to FIG. 6). Further, in the present example, rather than being mapped to interleaved frequency resources, the frequency domain representations of the respective pilot sequences 1010 are mapped to non-contiguous sub-bands.

Accordingly, transmission stream processor 220-*h* may map the pilot sequences 1010-*a* and 1010-*b* to respective subsets of time slots, and DFT components 1015-*a* and 1015-*b* may be used to transform the time domain pilot sequences 1010-*a* and 1010-*b* to respective frequency domain representations. Transmission stream processor 220-*h* may then map the frequency domain signals to a set of subcarriers (i.e., non-contiguous frequency bands), transform the mapped frequency domain signals to the time domain using IDFT component 1020, and append a cyclic prefix to the output of IDFT component 1020 using CP adder 1025. By mapping the pilot sequences to respective subsets of time slots, transmission stream processor 220-*h* may ensure that the resulting uplink transmission 1035 has a low PAPR.

Figure 11:
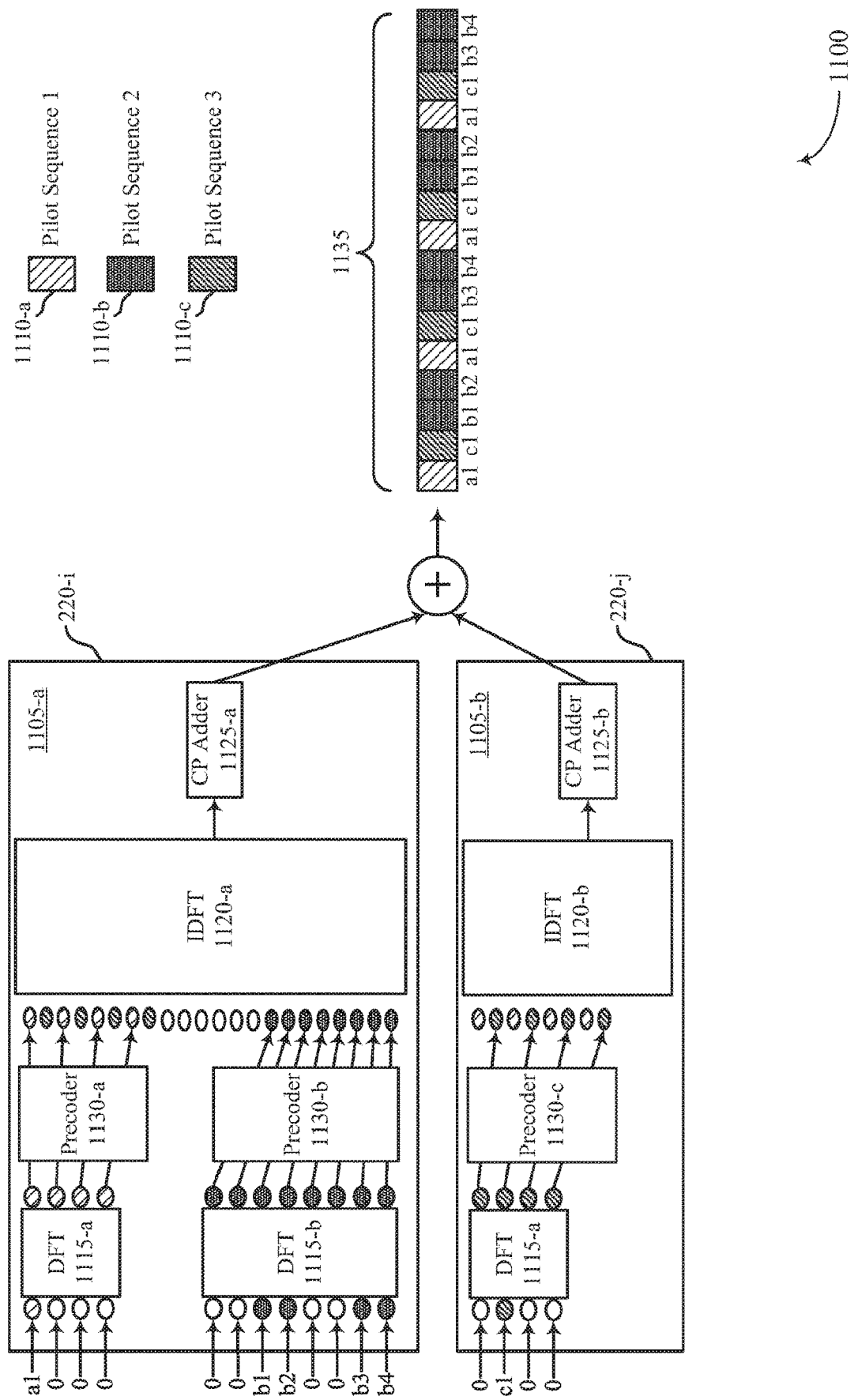

FIG. 11 illustrates an example of a signal processing scheme 1100, which supports low PAPR precoded reference signal design for MIMO transmission in accordance with various aspects of the present disclosure. Techniques described with reference to FIG. 11 may be performed at a UE 115, which may be an example of the corresponding device described with reference to FIGS. 1 through 3. In some cases, opposite but complementary techniques to those described with reference to FIG. 11 may be performed by a base station 105, as described with reference to FIGS. 1 and 2. FIG. 11 may support multi-port, multi-sub-band precoding in accordance with aspects of the present disclosure. That is, multiple ports and multiple precoders can also be multiplexed in the time domain. In some cases, there may be a limit on the number of sub-bands and/or the number of ports that can be processed using signal processing scheme 1100 since each pilot sequence 1110 in the time domain may get progressively narrower as the number of one or both of the sub-bands or ports increases. In some cases, the limitation may be based on, e.g., the propagation delay, delay spread, etc.

Signal processing scheme 1100 illustrates two logical antenna ports 1105-*a* and 1105-*b* with three respective pilots sequences 1110-*a*, 1110-*b*, and 1110-*c*. In the present example, the outputs of signal processing scheme 1100 are fed to a single physical antenna (not shown, but which may be an example of the corresponding components described with reference to FIGS. 2 and 3). In some cases, antenna ports 1105-*a* and 1105-*b* may each be connected to one or more physical antennas. Signal processing scheme 1100 may include processes performed by transmission stream processors 220-*i* and 220-*j*. Transmission stream processors 220-*i* and 220-*j* may include DFT components 1115-*a*, 1115-*b*, and 1115-*c*, IDFT components 1120-*a* and 1120-*b*, CP adders 1125-*a* and 1125-*b*, and precoders 1130-*a*, 1130-*b*, and 1130-*c*. These components may be used to process reference signals (e.g., the respective pilot sequences 1110) for an uplink transmission 1135.

Referring first to logical antenna port 1105-*a* at transmission stream processor 220-*i*, respective pilot sequences 1110-*a* and 1110-*b* may be fed to corresponding DFT components 1115-*a* and 1115-*b*. Before being converted into the frequency domain by the respective DFT components 1115-*a*, 1115-*b*, the respective pilot sequences 1110-*a*, 1110-*b* may be allocated to orthogonal time resources, as described above. In the present example, pilot sequence 1110-*a* may include a set of symbols (e.g., one symbol identified as a1 as illustrated) and may serve as input to DFT component 1115-*a* of transmission stream processor 220-*i*. Similarly, pilot sequence 1110-*b* may include a set of symbols (e.g., four symbols identified as b1 through b4) and may serve as input to DFT component 1115-*b* of transmission stream processor 220-*i*. Any suitable number of symbols may be contained in the pilot sequences 1110. Sets of symbols of the respective pilot sequences 1110 may be mapped to particular time and frequency domain resources for an uplink signal 1135. The mapping may correspond to a defined upsampling ratio, which may provide for repetition of output data symbols in the time domain. For example, FIG. 11 illustrates an upsampling ratio of 2 for pilot sequence 1110-*a* and an upsampling ration of 1 for pilot sequence 1110-*b*.

With reference to logical antenna port 1105-*b* at transmission stream processor 220-*j*, pilot sequence 1110-*c* may be fed to DFT component 1115-*c*. Before being converted into the frequency domain, the pilot sequence 1110-*c* may be allocated to time resources that are orthogonal to those of both pilot sequence 1110-*a* and pilot sequence 1110-*b*, as described above. Pilot sequence 1110-*c* may include a set of symbols (e.g., one symbol c1 as illustrated) and may serve as input to DFT component 1115-*c* of transmission stream processor 220-*j*. Any suitable number of symbols may be contained in pilot sequence 1110-*c*. Sets of symbols of pilot sequence 1110-*c* may be mapped to particular time and frequency domain resources for an uplink signal 1135. The mapping may correspond to a defined upsampling ratio, which may provide for repetition of output data symbols in the time domain. For example, FIG. 11 illustrates an upsampling ratio of 2 for pilot sequence 1110-*c*. Using the techniques described herein and illustrated with respect to FIG. 11, the uplink transmission 1135 at the physical antenna (not shown) may be single carrier and may contain desirable PAPR properties.

Figure 12A:
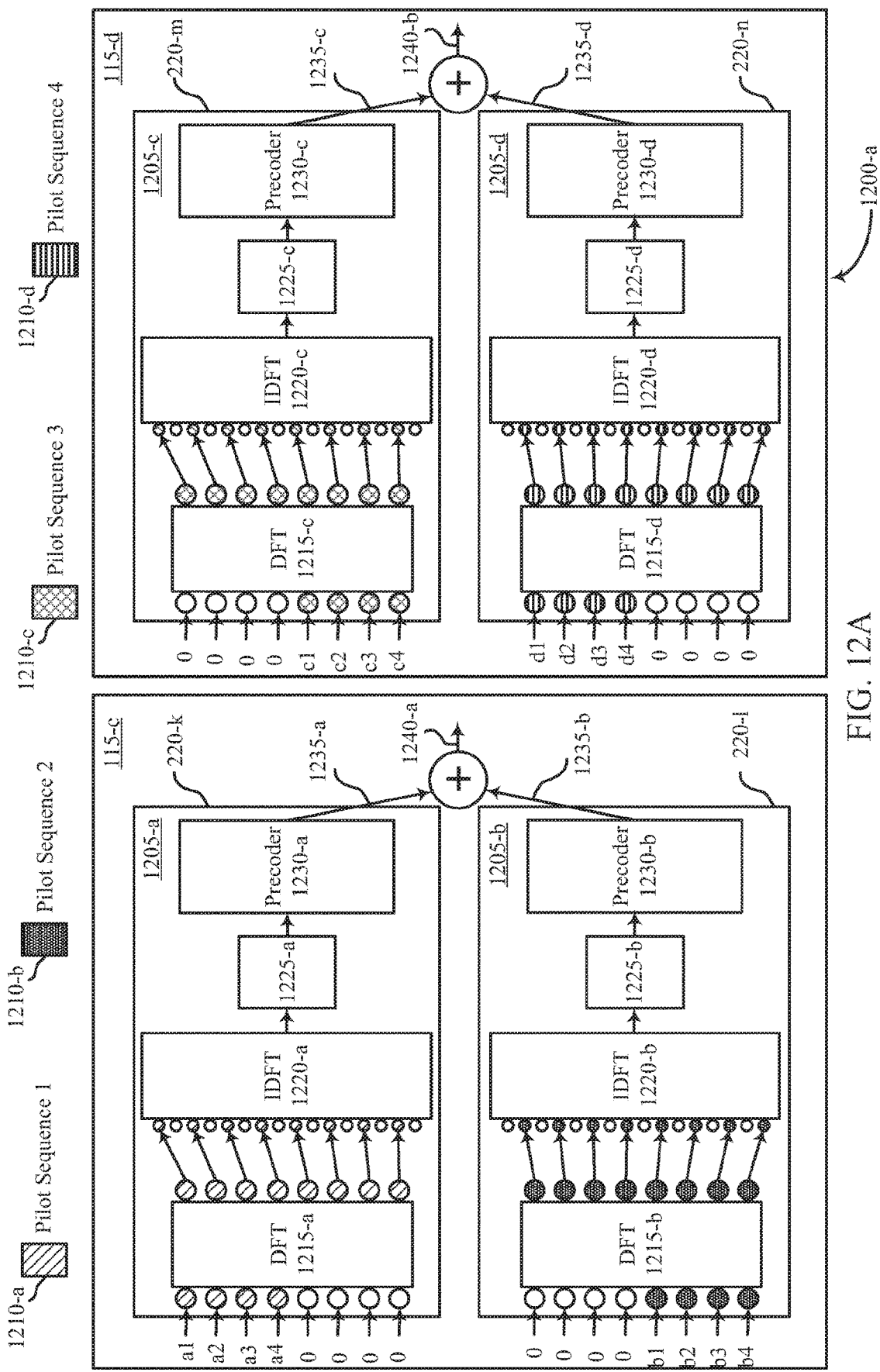

FIG. 12A illustrates an example of a signal processing scheme 1200-*a*, which supports low PAPR precoded reference signal design for MIMO transmission in accordance with various aspects of the present disclosure. Techniques described with reference to FIG. 12A may be performed at a UE 115, which may be an example of the corresponding device described with reference to FIGS. 1 through 3. In some cases, opposite but complementary techniques to those described with reference to FIG. 12 may be performed by a base station 105, as described with reference to FIGS. 1 and 2. FIG. 12A may support SRS transmissions from multiple users in accordance with aspects of the present disclosure.

Signal processing scheme 1200-*a* illustrates two UEs 115-*c* and 115-*d*, each with two antenna ports 1205 and two respective pilot sequences 1210. In the present example, the outputs of the signal processing schemes used to process signals at the logical antenna ports 1205 of each UE 115 are fed to a single antenna (not shown, but which may be an example of the corresponding components described with reference to FIGS. 2 and 3). In some cases, each antenna port 1205 may each be connected to one or more antennas. Signal processing scheme 1200-*a* may include processes performed by transmission stream processors 220-*k* and 220-*l* for the first and second antenna ports 1205-*a*, 1205-*b* of the first UE 115-*c*, and transmission stream processors 220-*m* and 220-*n* for the first and second antenna ports 1205-*c*, 1205-*d* of the second UE 115-*c*. Transmission stream processors 220 may include DFT components 1215, MET components 1220, CP adders 1225, and precoders 1230, each of which may be an example of one or more of the corresponding components described above. These components may be used to process reference signals (e.g., the respective pilot sequences 1210) for an uplink transmission 1240.

Techniques performed at each UE 115-*c* and 115-*d* may be analogous to the techniques described above with reference to FIG. 6A. Specifically, pilot sequences 1210 may be multiplexed in the time domain to ensure that a resulting uplink transmission has a low PAPR. In some examples, the first antenna port 1205-*a* for UE 115-*c* may be orthogonal in the time domain to the first antenna port 1205-*c* for UE 115-*d* and orthogonal to the second antenna port 1205-*b* for UE 115-*c* and the second antenna port 1205-*d* for UE 115-*d* in the frequency domain. Similarly, the second antenna port 1205-*b* for UE 115-*c* may be orthogonal in the time domain to the second antenna port 1205-*d* for UE 115-*d* and orthogonal to the first antenna port 1205-*a* for UE 115-*c* and the first antenna port 1205-*c* for UE 115-*d* in the frequency domain. Although two UEs 115-*c* and 115-*d* are illustrated, each containing two antenna ports 1205, any suitable number of ports and users may be used in accordance with the principles outlined in the present example. Thus, different subsets of time slots may be allocated to different UEs 115 for antenna ports mapped to the same frequency resources, maintaining orthogonality across UEs 115. In some cases, the allocated time slots to different UEs 115 may not be fully orthogonal, and some overlapping in the time domain may be permitted (e.g., pseudo-orthogonality). Thus, each UE 115 may transmit reference signals from multiple antenna ports mapped to physical antennas using low PAPR transmissions, while uplink transmissions from different UEs are transmitted on orthogonal time resources to reduce interference at the base station.

Figure 12B:
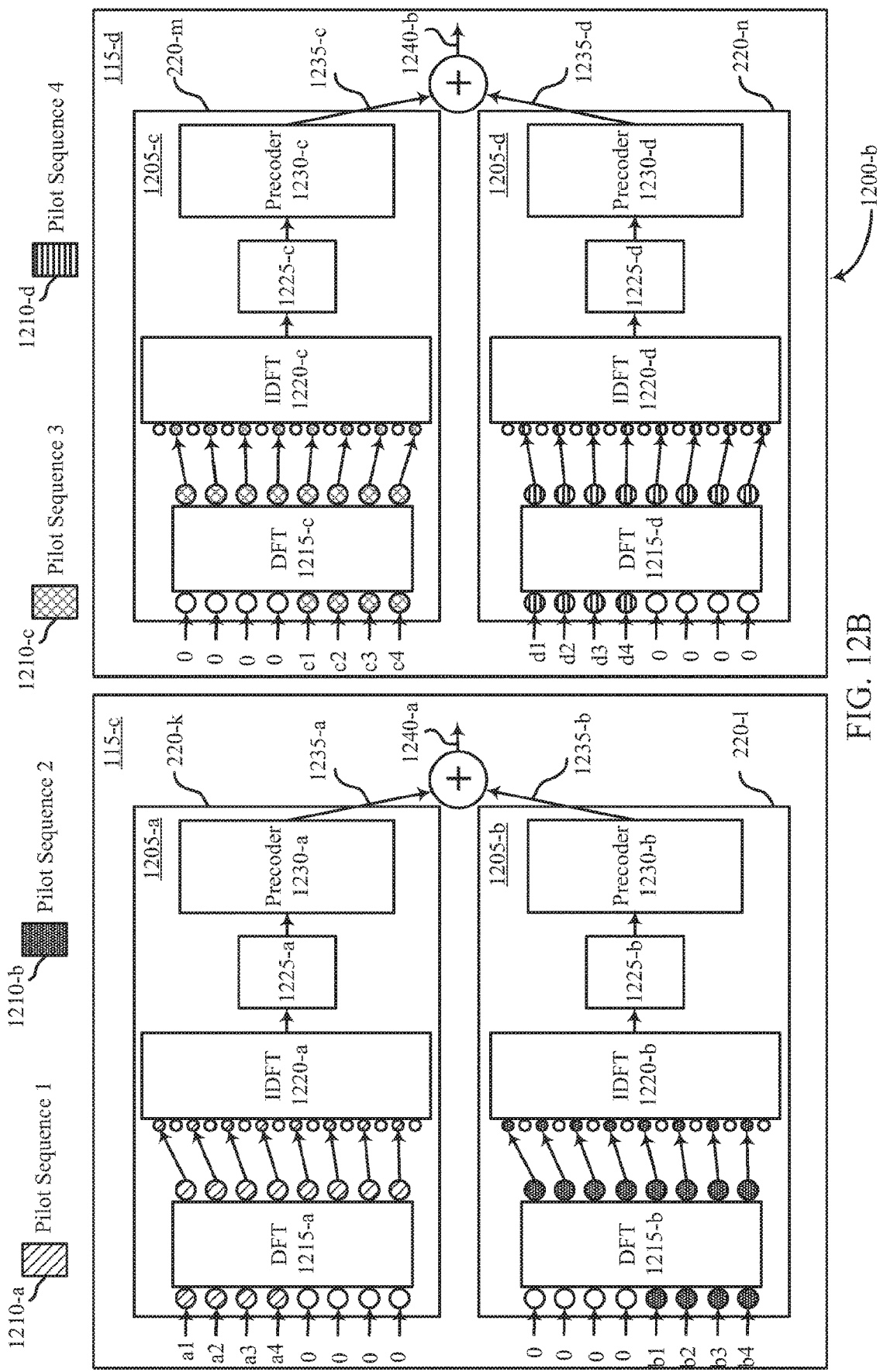

FIG. 12B illustrates an example of a signal processing scheme 1200-*b*, which supports low PAPR precoded reference signal design for MIMO transmission in accordance with various aspects of the present disclosure. Techniques described with reference to FIG. 12B may be performed at a UE 115, which may be an example of the corresponding device described with reference to FIGS. 1 through 3. In some cases, opposite but complementary techniques to those described with reference to FIG. 12B may be performed by a base station 105, as described with reference to FIGS. 1 and 2. FIG. 12B may support SRS transmissions from multiple users in accordance with aspects of the present disclosure.

Signal processing scheme 1200-*b* illustrates two UEs 115-*c* and 115-*d*, each with two antenna ports 1205 and two respective pilot sequences 1210. In the present example, the outputs of the signal processing schemes used to process signals at the logical antenna ports 1205 of each UE 115 are fed to a single antenna (not shown, but which may be an example of the corresponding components described with reference to FIGS. 2 and 3). In some cases, each antenna port 1205 may each be connected to one or more antennas. Signal processing scheme 1200-*b* may include processes performed by transmission stream processors 220-*k* and 220-*l* for the first and second antenna ports 1205 of the first UE 115-*c*, and transmission stream processors 220-*m* and 220-*n* for the first and second antenna ports 1205 of the second UE 115-*c*. Transmission stream processors 220 may include DFT components 1215, IDFT components 1220, CP adders 1225, and precoders 1230, each of which may be an example of one or more of the corresponding components described above. These components may be used to process reference signals (e.g., the respective pilot sequences 1210) for an uplink transmission 1240.

Techniques performed at each UE 115-*c* and 115-*d* may be analogous to aspects of the techniques described above with reference to FIGS. 6A and 6B. Specifically, pilot sequences 1210 may be multiplexed in the tune domain to ensure that a resulting uplink transmission has a low PAPR. In some examples, the first antenna port 1205-*a* for UE 115-*c* may be orthogonal in the time domain to the first antenna port 1205-*c* for UE 115-*d* and the second antenna port 1205-*d* for UE 115-*d* in the frequency domain. Similarly, the second antenna port 1205-*b* for UE 115-*c* may be orthogonal in the time domain to the second antenna port 1205-*d* for UE 115-*d* and orthogonal to the first antenna port 1205-*c* for UE 115-*d* in the frequency domain.

In the present example, the different UEs 115-*c* and 115-*d* may use respective sets of (e.g., non-overlapping) frequency tones. That is, both antenna ports 1205-*a* and 1205-*b* of UE 115-*c* may use the same set of frequency tones (e.g., and both antenna ports 1205-*c* and 1205-*d* of UE 115-*d* may use the same set of frequency tones). Orthogonality of the respective uplink transmissions 1240-*a* and 1240-*b* may be preserved (e.g., due to the time-domain orthogonality of the respective input pilot sequences 1210) as discussed with reference to FIG. 6B. However, repetition may be observed in the respective uplink transmissions 1240-*a* and 1240-*b* (e.g., a pattern similar or identical to that illustrated in uplink transmission 640 of FIG. 6A) because of the subcarrier mapping in the present example. That is, the upsampling ratio in the present example may be 2.

Although two UEs 115-*c* and 115-*d* are illustrated, each containing two antenna ports 1205, any suitable number of ports and users may be used in accordance with the principles outlined in the present example. Thus, different subsets of time slots may be allocated to different UEs for antenna ports mapped to the same frequency resources, maintaining orthogonality across UEs. In some cases, the allocated time slots to different UEs 115 may not be fully orthogonal, and some overlapping in the time domain may be permitted (e.g., pseudo-orthogonality). Thus, each UE 115 may transmit reference signals from multiple antenna ports mapped to physical antennas using low PAPR transmissions, while uplink transmissions from different UEs are transmitted on orthogonal time resources to reduce interference at the base station.

Figure 13:
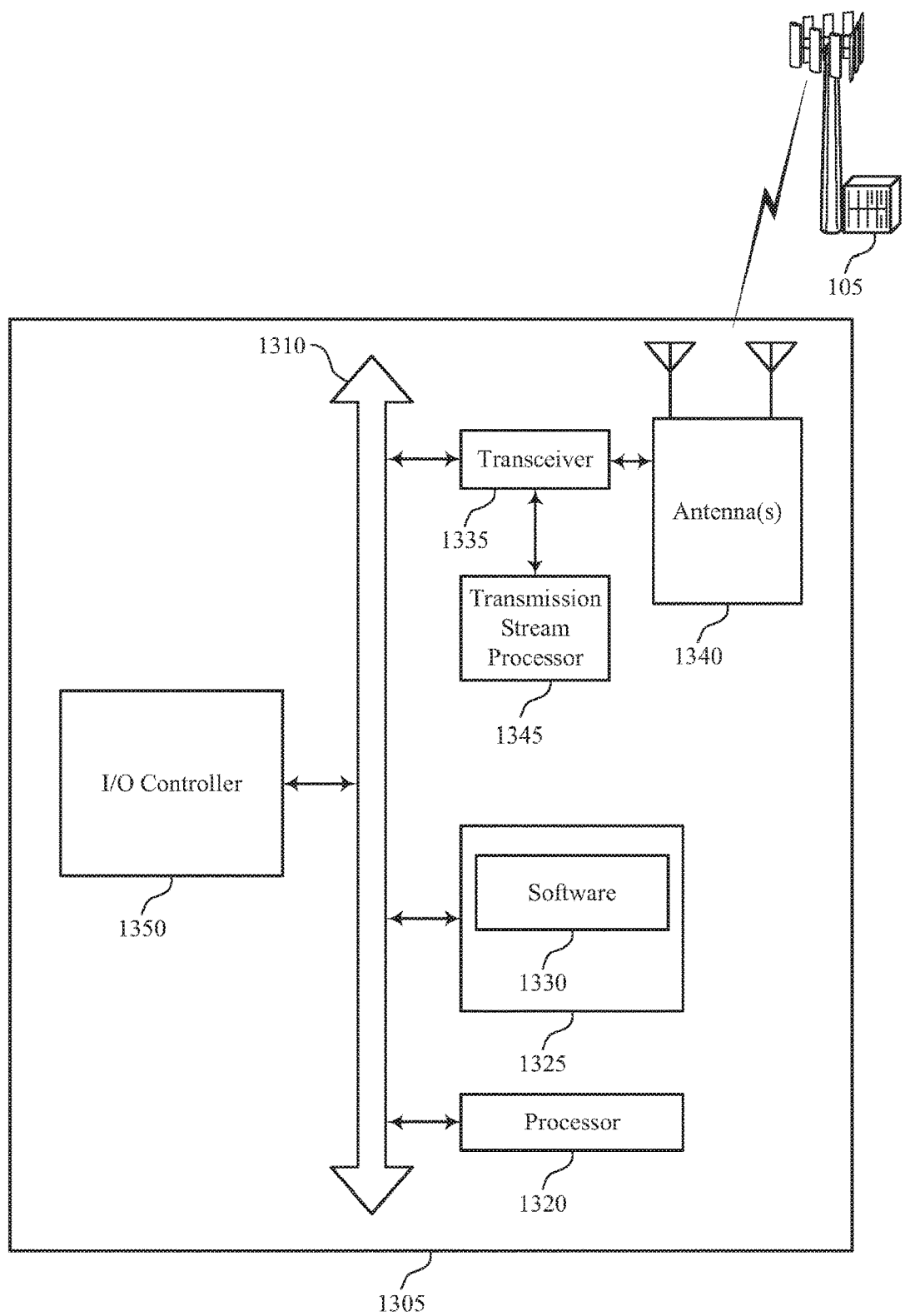
FIG. 13 illustrates a block diagram of a system including a user equipment (UE) that supports a low PAPR precoded reference signal design for MIMO transmissions in accordance with various aspects of the present disclosure.

FIG. 13 shows a diagram of a system 1300 including a device 1305 that supports low PAPR precoded reference signal design for MIMO transmission in accordance with various aspects of the present disclosure. Device 1305 may be an example of or include the components of a UE 115 described with reference to FIGS. 1 through 3 and FIG. 12. Device 1305 may include components for bi-directional voice and data communications including components for transmitting and receiving communications, including processor 1320, memory 1325, software 1330, transceiver 1335, antenna(s) 1340, transmission stream processor 1345, and I/O controller 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting time domain phase ramping for interlacing of multiple DFT spread waveforms).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support time domain phase ramping for interlacing of multiple DFT spread waveforms. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. As illustrated, device 1305 may have more than one antenna 1340, which may be capable of concurrently transmitting or receiving multiple wireless transmissions.

Transceiver 1335 may coordinate with a transmission stream processor 1345 to process signals for an uplink transmission. Transmission stream processor 1345 may include aspects of the transmission stream processors described with reference to FIGS. 2, 3, 6, 8, and 10 through 12. In some cases, transmission stream processor 1345 may identify a set of reference signal symbol sets for transmission via a set of antennas in a symbol period, where each of the set of reference signal symbol sets is associated with an antenna port, perform respective time to frequency domain transforms on the set of mapped reference signal symbol sets over respective time to frequency domain transform sizes to obtain a set of frequency domain signals, map the set of frequency domain signals to respective subsets of a set of subcarriers, perform respective frequency to time domain transforms on the set of mapped frequency domain signals to obtain a set of time domain waveforms, and transmit the set of time domain waveforms to a receiver via the set of antennas.

In some cases, the transmission stream processor 1345 may precode, for each of the set of antennas, the set of time domain waveforms using a precoding vector. In some cases, each precoding phasor of the precoding vector is within a predetermined range of other precoding phasors of the precoding vector.

In some cases, the transmission stream processor 1345 may precode, for each of the set of antennas, the set of frequency domain signals using a precoding vector. In some cases, each precoding phasor of the precoding vector is within a predetermined range of other precoding phasors of the precoding vector.

In some cases, the transmission stream processor 1345 may precode at least two of the set of frequency domain signals using a same precoding phasor, where the precoded at least two of the set of frequency domain signals are mapped to non-contiguous subsets of the set of subcarriers. In some cases, the plurality of reference signal symbol sets are orthogonal to each other within at least one of the plurality of time domain waveforms.

In some cases, the transmission stream processor 1345 may identify a desired frequency domain pilot sequence for at least one of the set of reference signal symbol sets and derive the at least one of the set of reference signal symbol sets based on the desired frequency domain pilot sequence. In some cases, deriving the at least one of the set of reference signal symbol sets includes performing a frequency to time domain transform based on the identified desired frequency domain pilot sequence.

In some cases, the transmission stream processor 1345 may determine the respective subsets of the set of time slots based on a transform size of the respective time to frequency domain transforms. In some cases, the transmission stream processor 1345 may determine the respective subsets of the set of time slots based on frequency domain upsampling factors of the respective subsets of the set of subcarriers. In some cases, the transmission stream processor 1345 may determine the respective subsets of the set of time slots based on a transform size of the frequency to time domain transform.

In some cases, at least two of the respective subsets of the set of subcarriers comprise interleaved subcarriers with respect to each other. In some cases, at least two of the respective subsets of the set of subcarriers are non-contiguous with respect to each other. In some cases, at least two of the respective subsets of the set of subcarriers partially overlap or fully overlap. In some cases, the respective time to frequency domain transform sizes of at least two of the respective time to frequency domain transforms are a same transform size. In some cases, the respective time to frequency domain transform sizes of at least two of the respective time to frequency domain transforms are different with respect to each other. In some cases, a first respective subset of the set of time slots is assigned to a first wireless device for at least one of the set of reference signal symbol sets and a second respective subset of the set of time slots is assigned to a second wireless device for a corresponding reference signal symbol set.

I/O controller 1350 may manage input and output signals for device 1305. I/O controller 1350 may also manage peripherals not integrated into device 1305. In some cases, I/O controller 1350 may represent a physical connection or port to an external peripheral. I/O controller 1350 may represent or interact with a modem, a keyboard, a mouse, a touchscreen, or a similar device, in some cases, Processor 1320 may utilize an operating system such as iOS®, ANDROID®, MS-DOS®, MS-WINDOWS®, OS/2®, UNIX®, LINUX®, or another known operating system. In some cases, I/O controller 1350 may be implemented as part of processor 1320. In some cases, a user may interact with device 1305 via I/O controller 1350 or via hardware components controlled by I/O controller 1350.

Figure 14:
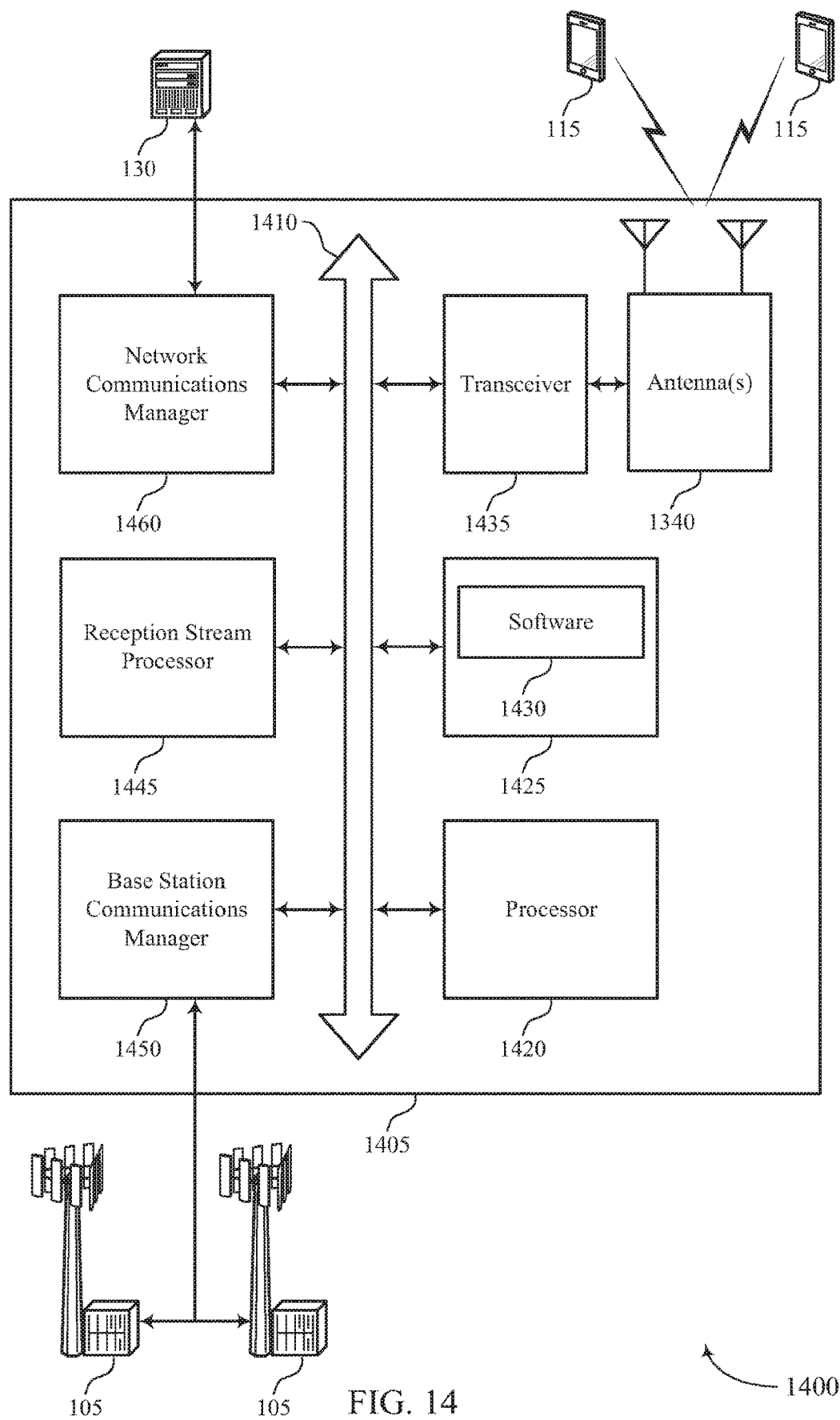
FIG. 14 illustrates a block diagram of a system including a base station that supports a low PAPR precoded reference signal design for MIMO transmissions in accordance with various aspects of the present disclosure.

FIG. 14 shows a diagram of a system 1400 including a device 1405 that supports low PAPR precoded reference signal design for MIMO transmission in accordance with various aspects of the present disclosure. Device 1405 may be an example of or include the components of base station 105 as described above, e.g., with reference to FIGS. 1 and 2. Device 1405 may include components for bi-directional voice and data communications including components for transmitting and receiving communications, including processor 1420, memory 1425, software 1430, transceiver 1435, antenna(s) 1440, network communications manager 1460, and base station communications manager 1450. These components may be in electronic communication via one or more busses (e.g., bus 1410). Device 1405 may communicate wirelessly with one or more UEs 115. Specifically, device 1405 may include a reception stream processor 1445 having components corresponding to the inverse functions (e.g., cyclic prefix removal, DFT, IDFT, de-mapping, de-spreading, decoding) to the functions of a transmission stream processors described with reference to FIGS. 2, 3, 6, 8, and 10 through 12. Although illustrated as implemented in a device 1405 including the components of a base station 105, a reception stream processor 1445 may be implemented in any wireless communication device such as an access point, repeater, relay station, or UE115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting time domain phase ramping for interlacing of multiple DFT spread waveforms.

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support time domain phase ramping for interlacing of multiple DFT spread waveforms. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via multiple antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. The wireless device 1405 may have more than one antenna 1440, which may be capable of concurrently transmitting or receiving multiple wireless transmissions.

Network communications manager 1460 may manage communications with the core network (e.g., via one or more wired backhaul links). For example, the network communications manager 1460 may manage the transfer of data communications for client devices, such as one or more UEs 115.

Base station communications manager 1450 may manage communications with other base stations 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
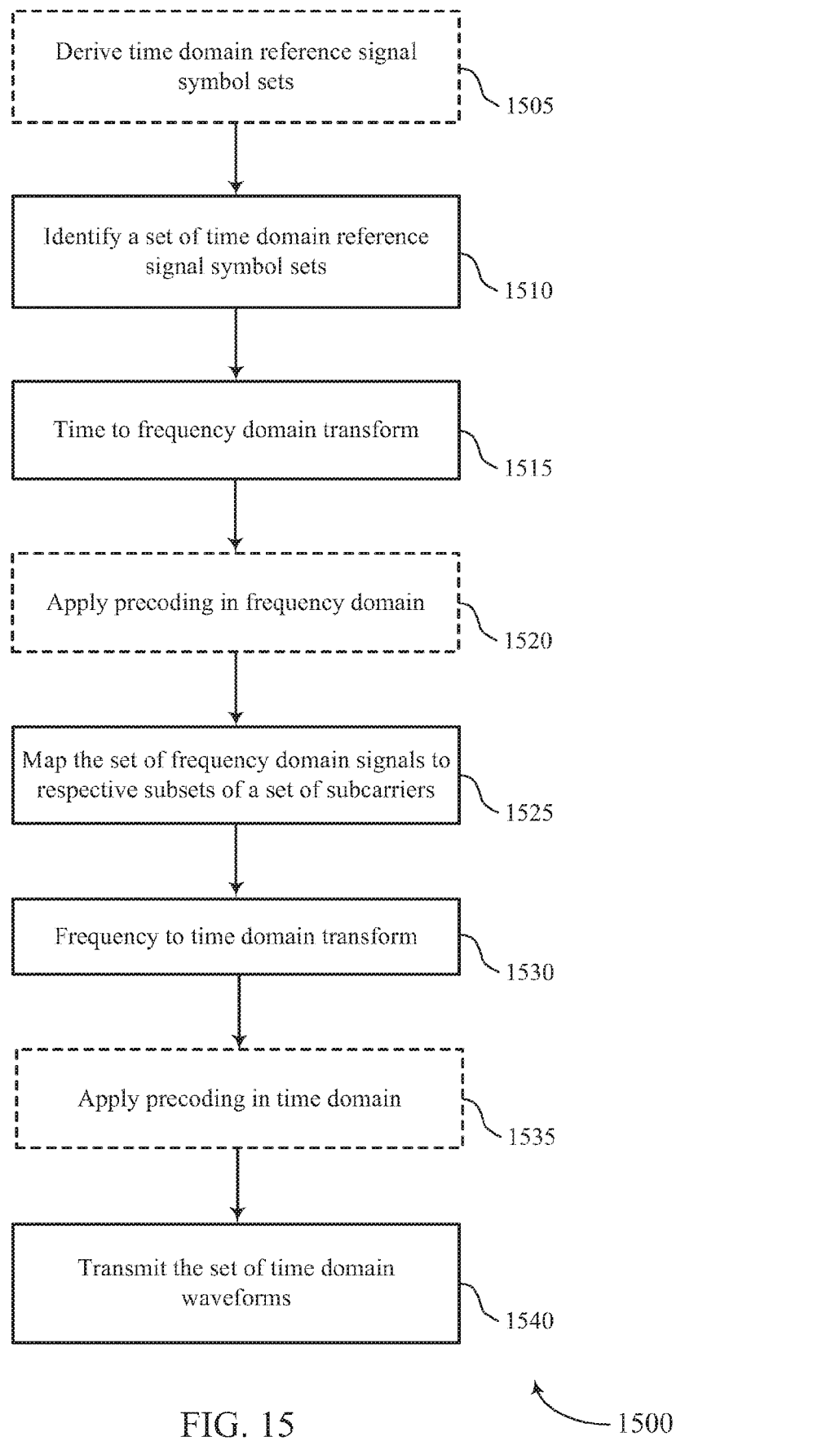
FIG. 15 illustrates a method for low PAPR precoded reference signal design for MIMO transmissions in accordance with various aspects of the present disclosure.

FIG. 15 shows a flowchart illustrating a method 1500 that supports low PAPR precoded reference signal design for MIMO transmission in accordance with various aspects of the present disclosure. The operations of method 1500 may be implemented by a UE 115 or its components as described herein. For example, the operations of method 1500 may be performed by a transmission stream processor 220 as described above. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may optionally identify a desired frequency domain pilot sequence for at least one of a plurality of time domain reference signal symbol sets and derive the at least one of the plurality of time domain reference signal symbol sets based at least in part on the desired frequency domain pilot sequence. For example, the time domain reference signal symbol sets may be derived by performing a frequency to time domain transform on the identified desired frequency domain pilot sequence. The operations of 1505 may be performed according to the methods described herein.

At 1510, the UE 115 may identify a plurality of time domain reference signal symbol sets for transmission via a plurality of antennas in a symbol period, wherein each of the plurality of time domain reference signal symbol sets is associated with an antenna port. In some cases, one or more of the plurality of time domain reference signal symbol sets may be derived at 1505.

At 1515, the UE 115 may perform respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms. In some examples, two or more of the time to frequency domain transforms may have a same transform size. For example, a first time domain reference signal symbol set may be mapped to a first half (e.g., or some suitable fraction) of the time domain inputs of a time to frequency domain transform having a given size while a second time domain reference signal symbol set may be mapped to the second half (e.g., or some suitable fraction) of time domain inputs of a time to frequency domain transform having the given size. In some cases, such mapping may be achieved through inserting one or more null data points (e.g., zero padding) into the respective time domain reference signal symbol sets. In other examples, various techniques described above may be used to map the respective time domain reference signal symbol sets to appropriate time domain inputs of the respective time to frequency domain transforms. In some cases, the operations of 1515 may be performed by a DFT component as described above.

At 1520, the UE 115 may optionally apply precoding to at least a subset of the frequency domain signals. For example, the UE 115 may apply a first precoding phasor to a first subset of frequency domain signals and a second precoding phasor to a second subset of frequency domain signals. In some cases the first subset of frequency domain signals may be mapped to a first set of subcarriers while the second subset of frequency domain signals may be mapped to a second set of subcarriers. The operations of 1520 may be performed according to the methods described herein.

At 1525, the UE 115 may map the set of frequency domain signals to respective subsets of a set of subcarriers. In various examples, the respective subsets of subcarriers may partially overlap or be disjoint. In some cases, an upsampling ratio of the frequency domain signals may be based at least in part on the subcarriers to which the frequency domain signals are mapped. The operations of 1525 may be performed according to the methods described herein.

At 1530, the UE 115 may perform respective frequency to time domain transforms on the plurality of mapped frequency domain signals to obtain a plurality of time domain waveforms. The operations of 1530 may be performed according to the methods described herein. In some cases, the operations of 1530 may be performed by an IDFT component as described above.

At 1535, the UE 115 may optionally apply precoding to at least a subset of time domain waveforms. In some cases, applying precoding to a time domain waveform may comprise applying a same precoding phasor to all subcarriers associated with the time domain waveform. Accordingly, in some cases, only one of the operations of 1520 and 1535 may be performed for a given signal. Alternatively, in some cases, phase shifting may be achieved by applying precoding in the frequency domain at 1520 and amplitude modulation may be achieved by applying precoding in the time domain at 1535.

At 1540, the UE 115 may transmit the plurality of time domain waveforms to a receiver via the plurality of antennas in the symbol period. The operations of 1540 may be performed according to the methods described herein.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pica eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a plurality of time domain reference signal symbol sets for transmission via a plurality of antennas in a symbol period, wherein each of the plurality of time domain reference signal symbol sets is associated with an antenna port;
performing respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms;
mapping the plurality of frequency domain signals to respective subsets of a set of subcarriers;
performing respective frequency to time domain transforms on the plurality of mapped frequency domain signals to obtain a plurality of time domain waveforms; and
transmitting the plurality of time domain waveforms to a receiver via the plurality of antennas in the symbol period.

2. The method of claim 1, further comprising:
precoding, for each of the plurality of antennas, the plurality of time domain waveforms using a precoding vector.

3. The method of claim 2, wherein each precoding phasor of the precoding vector is within a predetermined range of other precoding phasors of the precoding vector.

4. The method of claim 1, further comprising:
precoding, for each of the plurality of antennas, the plurality of frequency domain signals using a precoding vector.

5. The method of claim 4, wherein each precoding phasor of the precoding vector is within a predetermined range of other precoding phasors of the precoding vector.

6. The method of claim 1, further comprising:
precoding, for each of the plurality of antennas, at least two of the plurality of frequency domain signals using a same precoding phasor, wherein the precoded at least two of the plurality of frequency domain signals are mapped to non-contiguous subsets of the set of subcarriers.

7. The method of claim 1, wherein the plurality of time domain reference signal symbol sets are orthogonal to each other within at least one of the plurality of time domain waveforms.

8. The method of claim 1, further comprising:
identifying a desired frequency domain pilot sequence for at least one of the plurality of time domain reference signal symbol sets; and
deriving the at least one of the plurality of time domain reference signal symbol sets based at least in part on the desired frequency domain pilot sequence.

9. The method of claim 8, wherein the deriving the at least one of the plurality of time domain reference signal symbol sets comprises:
performing a frequency to time domain transform based at least in part on the identified desired frequency domain pilot sequence.

10. The method of claim 1, further comprising:
determining the respective subsets of time domain inputs based at least in part on transform sizes of the respective time to frequency domain transform sizes.

11. The method of claim 1, further comprising:
determining the respective subsets of time domain inputs based at least in part on frequency domain upsampling factors of the respective subsets of the set of subcarriers.

12. The method of claim 1, further comprising:
determining the respective subsets of time domain inputs based at least in pail on a transform size of the frequency to time domain transform.

13. The method of claim 1, wherein at least two of the respective subsets of the set of subcarriers comprise interleaved subcarriers with respect to each other.

14. The method of claim 13, wherein a frequency domain upsampling factor of the at least two of the respective subsets of the set of subcarriers is based at least in part on an interleaving pattern of the interleaved subcarriers.

15. The method of claim 1, wherein at least two of the respective subsets of the set of subcarriers are non-contiguous with respect to each other.

16. The method of claim 1, wherein at least two of the respective subsets of the set of subcarriers at least partially overlap with each other.

17. The method of claim 1, wherein the respective time to frequency domain transform sizes of at least two of the respective time to frequency domain transforms are a same transform size.

18. The method of claim 17, wherein the subset of time domain inputs of a first of the at least two of the respective time to frequency domain transforms is disjoint with the subset of time domain inputs of a second of the at least two of the respective time to frequency domain transforms.

19. The method of claim 1, wherein the respective time to frequency domain transform sizes of at least two of the respective time to frequency domain transforms are different with respect to each other.

20. The method of claim 1, wherein each time domain reference signal symbol set is mapped to the respective subset of time domain inputs of the respective time to frequency domain transforms based at least in part on inserting one or more null data points into at least one of the time domain reference signal symbol sets.

21. The method of claim 1, wherein a first time domain reference signal symbol set at a first wireless device is mapped to a first subset of time domain inputs of a first time to frequency domain transform to generate a first frequency domain signal and a second time domain reference signal symbol set at a second wireless device is mapped to a same subset of time domain inputs of a second time to frequency domain transform to generate a second frequency domain signal, the method further comprising:
mapping, at the first wireless device, the first frequency domain signal to a first subset of subcarriers, the first subset of subcarriers being orthogonal in the frequency domain to a corresponding subset of subcarriers to which the second frequency domain signal is mapped at the second wireless device.

22. An apparatus for wireless communication, comprising:
means for identifying a plurality of time domain reference signal symbol sets for transmission via a plurality of antennas in a symbol period, wherein each of the plurality of time domain reference signal symbol sets is associated with an antenna port;
means for performing respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms;
means for mapping the plurality of frequency domain signals to respective subsets of a set of subcarriers:
means for performing respective frequency to time domain transforms on the plurality of mapped frequency domain signals to obtain a plurality of time domain waveforms; and
means for transmitting the plurality of time domain waveforms to a receiver via the plurality of antennas in the symbol period.

23. The apparatus of claim 22, further comprising:
means for precoding, for each of the plurality of antennas, the plurality of time domain waveforms using a precoding vector.

24. The apparatus of claim 23, wherein:
each precoding phasor of the precoding vector is within a predetermined range of other precoding phasors of the precoding vector.

25. The apparatus of claim 22, further comprising:
means for precoding, for each of the plurality of antennas, the plurality of frequency domain signals using a precoding vector.

26. The apparatus of claim 25, wherein:
each precoding phasor of the precoding vector is within a predetermined range of other precoding phasors of the precoding vector.

27. The apparatus of claim 22, further comprising:
means for precoding, for each of the plurality of antennas, at least two of the plurality of frequency domain signals using a same precoding phasor, wherein the precoded at least two of the plurality of frequency domain signals are mapped to non-contiguous subsets of the set of subcarriers.

28. The apparatus of claim 22, wherein:
the plurality of time domain reference signal symbol sets are orthogonal to each other within at least one of the plurality of time domain waveforms.

29. The apparatus of claim 22, further comprising:
means for identifying a desired frequency domain pilot sequence for at least one of the plurality of time domain reference signal symbol sets; and
means for deriving the at least one of the plurality of time domain reference signal symbol sets based at least in part on the desired frequency domain pilot sequence.

30. The apparatus of claim 29, further comprising:
means for performing a frequency to time domain transform based at least in part on the identified desired frequency domain pilot sequence.

31. The apparatus of claim 22, further comprising:
means for determining the respective subsets of time domain inputs based at least in part on transform sizes of the respective time to frequency domain transform sizes.

32. The apparatus of claim 22, further comprising:
means for determining the respective subsets of time domain inputs based at least in part on frequency domain upsampling factors of the respective subsets of the set of subcarriers.

33. The apparatus of claim 22, further comprising:
means for determining the respective subsets of time domain inputs based at least in part on a transform size of the frequency to time domain transform.

34. The apparatus of claim 22, wherein:
at least two of the respective subsets of the set of subcarriers comprise interleaved subcarriers with respect to each other.

35. The apparatus of claim 34, wherein:
a frequency domain upsampling factor of the at least two of the respective subsets of the set of subcarriers is based at least in part on an interleaving pattern of the interleaved subcarriers.

36. The apparatus of claim 22, wherein:
at least two of the respective subsets of the set of subcarriers are non-contiguous with respect to each other.

37. The apparatus of claim 22, wherein:
at least two of the respective subsets of the set of subcarriers at least partially overlap with each other.

38. The apparatus of claim 22, wherein:
the respective time to frequency domain transform sizes of at least two of the respective time to frequency domain transforms are a same transform size.

39. The apparatus of claim 38, wherein:
the subset of time domain inputs of a first of the at least two of the respective time to frequency domain transforms is disjoint with the subset of time domain inputs of a second of the at least two of the respective time to frequency domain transforms.

40. The apparatus of claim 22, wherein:
the respective time to frequency domain transform sizes of at least two of the respective time to frequency domain transforms are different with respect to each other.

41. The apparatus of claim 22, wherein:
each time domain reference signal symbol set is mapped to the respective subset of time domain inputs of the respective time to frequency domain transforms based at least in part on inserting one or more null data points into at least one of the time domain reference signal symbol sets.

42. The apparatus of claim 22, further comprising:
means for mapping, at the first wireless device, the first frequency domain signal to a first subset of subcarriers, the first subset of subcarriers being orthogonal in the frequency domain to a corresponding subset of subcarriers to which the second frequency domain signal is mapped at the second wireless device.

43. An apparatus for wireless communication, comprising:
a processor;
memory in electronic communication with the processor; and
instructions stored in the memory and operable, when executed by the processor, to cause the apparatus to:
identify a plurality of time domain reference signal symbol sets for transmission via a plurality of antennas in a symbol period, wherein each of the plurality of time domain reference signal symbol sets is associated with an antenna port;
perform respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms;
map the plurality of frequency domain signals to respective subsets of a set of subcarriers;
perform respective frequency to time domain transforms on the plurality of mapped frequency domain signals to obtain a plurality of time domain waveforms; and
transmit the plurality of time domain waveforms to a receiver via the plurality of antennas in the symbol period.

44. The apparatus of claim 43, wherein the instructions are further executable by the processor to:
precode, for each of the plurality of antennas, the plurality of time domain waveforms using a precoding vector.

45. The apparatus of claim 44, wherein:
each precoding phasor of the precoding vector is within a predetermined range of other precoding phasors of the precoding vector.

46. The apparatus of claim 43, wherein the instructions are further executable by the processor to:
precode, for each of the plurality of antennas, the plurality of frequency domain signals using a precoding vector.

47. The apparatus of claim 46, wherein:
each precoding phasor of the precoding vector is within a predetermined range of other precoding phasors of the precoding vector.

48. The apparatus of claim 43, wherein the instructions are further executable by the processor to:
precode, for each of the plurality of antennas, at least two of the plurality of frequency domain signals using a same precoding phasor, wherein the precoded at least two of the plurality of frequency domain signals are mapped to non-contiguous subsets of the set of subcarriers.

49. The apparatus of claim 43, wherein:
the plurality of time domain reference signal symbol sets are orthogonal to each other within at least one of the plurality of time domain waveforms.

50. The apparatus of claim 43, wherein the instructions are further executable by the processor to:
identify a desired frequency domain pilot sequence for at least one of the plurality of time domain reference signal symbol sets; and
derive the at least one of the plurality of time domain reference signal symbol sets based at least in part on the desired frequency domain pilot sequence.

51. The apparatus of claim 50, wherein the instructions are further executable by the processor to:
perform a frequency to time domain transform based at least in part on the identified desired frequency domain pilot sequence.

52. The apparatus of claim 43, wherein the instructions are further executable by the processor to:
determine the respective subsets of time domain inputs based at least in part on transform sizes of the respective time to frequency domain transform sizes.

53. The apparatus of claim 43, wherein the instructions are further executable by the processor to:
determine the respective subsets of time domain inputs based at least in part on frequency domain upsampling factors of the respective subsets of the set of subcarriers.

54. The apparatus of claim 43, wherein the instructions are further executable by the processor to:
determine the respective subsets of time domain inputs based at least in part on a transform size of the frequency to time domain transform.

55. The apparatus of claim 43, wherein:
at least two of the respective subsets of the set of subcarriers comprise interleaved subcarriers with respect to each other.

56. The apparatus of claim 55, wherein:
a frequency domain upsampling factor of the at least two of the respective subsets of the set of subcarriers is based at least in part on an interleaving pattern of the interleaved subcarriers.

57. The apparatus of claim 43, wherein:
at least two of the respective subsets of the set of subcarriers are non-contiguous with respect to each other.

58. The apparatus of claim 43, wherein:
at least two of the respective subsets of the set of subcarriers at least partially overlap with each other.

59. The apparatus of claim 43, wherein:
the respective time to frequency domain transform sizes of at least two of the respective time to frequency domain transforms are a same transform size.

60. The apparatus of claim 59, wherein:
the subset of time domain inputs of a first of the at least two of the respective time to frequency domain transforms is disjoint with the subset of time domain inputs of a second of the at least two of the respective time to frequency domain transforms.

61. The apparatus of claim 43, wherein:
the respective time to frequency domain transform sizes of at least two of the respective time to frequency domain transforms are different with respect to each other.

62. The apparatus of claim 43, wherein:
each time domain reference signal symbol set is mapped to the respective subset of time domain inputs of the respective time to frequency domain transforms based at least in part on inserting one or more null data points into at least one of the time domain reference signal symbol sets.

63. The apparatus of claim 43, wherein the instructions are further executable by the processor to:
map, at the first wireless device, the first frequency domain signal to a first subset of subcarriers, the first subset of subcarriers being orthogonal in the frequency domain to a corresponding subset of subcarriers to which the second frequency domain signal is mapped at the second wireless device.

64. A non-transitory computer readable medium storing code for wireless communication, the code comprising instructions executable by a processor to:
identify a plurality of time domain reference signal symbol sets for transmission via a plurality of antennas in a symbol period, wherein each of the plurality of time domain reference signal symbol sets is associated with an antenna port;
perform respective time to frequency domain transforms on the plurality of time domain reference signal symbol sets over respective time to frequency domain transform sizes to obtain a plurality of frequency domain signals, wherein, for the respective time to frequency domain transforms, respective time domain reference signal symbol sets are mapped to respective subsets of time domain inputs of the respective time to frequency domain transforms;
map the plurality of frequency domain signals to respective subsets of a set of subcarriers;
perform respective frequency to time domain transforms on the plurality of mapped frequency domain signals to obtain a plurality of time domain waveforms; and
transmit the plurality of time domain waveforms to a receiver via the plurality of antennas in the symbol period.

65. The non-transitory computer-readable medium of claim 64, wherein the instructions are further executable by the processor to:
precode, for each of the plurality of antennas, the plurality of time domain waveforms using a precoding vector.

66. The non-transitory computer-readable medium of claim 65, wherein:
each precoding phasor of the precoding vector is within a predetermined range of other precoding phasors of the precoding vector.

67. The non-transitory computer-readable medium of claim 64, wherein the instructions are further executable by the processor to:
precode, for each of the plurality of antennas, the plurality of frequency domain signals using a precoding vector.

68. The non-transitory computer-readable medium of claim 67, wherein:
each precoding phasor of the precoding vector is within a predetermined range of other precoding phasors of the precoding vector.

69. The non-transitory computer-readable medium of claim 64, wherein the instructions are further executable by the processor to:
precode, for each of the plurality of antennas, at least two of the plurality of frequency domain signals using a same precoding phasor, wherein the precoded at least two of the plurality of frequency domain signals are mapped to non-contiguous subsets of the set of subcarriers.

70. The non-transitory computer-readable medium of claim 64, wherein:
the plurality of time domain reference signal symbol sets are orthogonal to each other within at least one of the plurality of time domain waveforms.

71. The non-transitory computer-readable medium of claim 64, wherein the instructions are further executable by the processor to:

identify a desired frequency domain pilot sequence for at least one of the plurality of time domain reference signal symbol sets; and
derive the at least one of the plurality of time domain reference signal symbol sets based at least in part on the desired frequency domain pilot sequence.

72. The non-transitory computer-readable medium of claim 71, wherein the instructions are further executable by the processor to:
perform a frequency to time domain transform based at least in part on the identified desired frequency domain pilot sequence.

73. The non-transitory computer-readable medium of claim 64, wherein the instructions are further executable by the processor to:
determine the respective subsets of time domain inputs based at least in part on transform sizes of the respective time to frequency domain transform sizes.

74. The non-transitory computer-readable medium of claim 64, wherein the instructions are further executable by the processor to:
determine the respective subsets of time domain inputs based at least in part on frequency domain upsampling factors of the respective subsets of the set of subcarriers.

75. The non-transitory computer-readable medium of claim 64, wherein the instructions are further executable by the processor to:
determine the respective subsets of time domain inputs based at least in part on a transform size of the frequency to time domain transform.

76. The non-transitory computer-readable medium of claim 64, wherein:
at least two of the respective subsets of the set of subcarriers comprise interleaved subcarriers with respect to each other.

77. The non-transitory computer-readable medium of claim 76, wherein:
a frequency domain upsampling factor of the at least two of the respective subsets of the set of subcarriers is based at least in part on an interleaving pattern of the interleaved subcarriers.

78. The non-transitory computer-readable medium of claim 64, wherein:
at least two of the respective subsets of the set of subcarriers are non-contiguous with respect to each other.

79. The non-transitory computer-readable medium of claim 64, wherein:
at least two of the respective subsets of the set of subcarriers at least partially overlap with each other.

80. The non-transitory computer-readable medium of claim 64, wherein:
the respective time to frequency domain transform sizes of at least two of the respective time to frequency domain transforms are a same transform size.

81. The non-transitory computer-readable medium of claim 80, wherein:
the subset of time domain inputs of a first of the at least two of the respective time to frequency domain transforms is disjoint with the subset of time domain inputs of a second of the at least two of the respective time to frequency domain transforms.

82. The non-transitory computer-readable medium of claim 64, wherein:

the respective time to frequency domain transform sizes of at least two of the respective time to frequency domain transforms are different with respect to each other.

83. The non-transitory computer-readable medium of claim 64, wherein:
each time domain reference signal symbol set is mapped to the respective subset of time domain inputs of the respective time to frequency domain transforms based at least in part on inserting one or more null data points into at least one of the time domain reference signal symbol sets.

84. The non-transitory computer-readable medium of claim 64, wherein the instructions are further executable by the processor to:
map, at the first wireless device, the first frequency domain signal to a first subset of subcarriers, the first subset of subcarriers being orthogonal in the frequency domain to a corresponding subset of subcarriers to which the second frequency domain signal is mapped at the second wireless device.

\* \* \* \* \*